(12) United States Patent
Tanino

(10) Patent No.: US 11,993,727 B2
(45) Date of Patent: May 28, 2024

(54) ANTIFOULING COATING FILM AND METHOD OF MANUFACTURING SAME, WATER CONTACTING STRUCTURE WITH ANTIFOULING COATING FILM, AND ANTIFOULING TAPE AND METHOD OF MANUFACTURING SAME

(71) Applicant: CHUGOKU MARINE PAINTS, LTD., Otake (JP)

(72) Inventor: Soichiro Tanino, Otake (JP)

(73) Assignee: CHUGOKU MARINE PAINTS, LTD., Otake (JP)

( * ) Notice: Subject to any disclaimer, the term of this patent is extended or adjusted under 35 U.S.C. 154(b) by 917 days.

(21) Appl. No.: 17/041,352

(22) PCT Filed: Mar. 27, 2019

(86) PCT No.: PCT/JP2019/013278
§ 371 (c)(1),
(2) Date: Sep. 24, 2020

(87) PCT Pub. No.: WO2019/189412
PCT Pub. Date: Oct. 3, 2019

(65) Prior Publication Data
US 2021/0024757 A1   Jan. 28, 2021

(30) Foreign Application Priority Data

Mar. 28, 2018   (JP) ................................. 2018-063176

(51) Int. Cl.
*C09D 5/16* (2006.01)
*A01N 43/36* (2006.01)
(Continued)

(52) U.S. Cl.
CPC ........... *C09D 5/1681* (2013.01); *A01N 43/36* (2013.01); *A01N 43/80* (2013.01); *A01N 59/20* (2013.01); *B08B 17/06* (2013.01); *B32B 7/12* (2013.01); *B32B 27/08* (2013.01); *B32B 27/20* (2013.01); *B32B 27/283* (2013.01); *C08K 3/013* (2018.01); *C08K 3/36* (2013.01); *C09D 5/1675* (2013.01);
(Continued)

(58) Field of Classification Search
CPC .. C09D 5/1681; C09D 5/1675; C09D 5/1687; C09D 7/61; C09D 5/1693; C09D 5/1625; C09D 7/63; C09D 7/65; C09D 183/04; C09D 183/12; C09D 5/14; A01N 43/36; A01N 43/80; A01N 59/20; A01N 25/10; A01N 25/34; A01N 43/40; B08B 17/06; B32B 7/12; B32B 27/08; B32B 27/20; B32B 27/283; B32B 2307/538; B32B 2307/732; B32B 2255/12; B32B 2255/20; B32B 5/022; B32B 7/06; B32B 15/082; B32B 15/18; B32B 15/20; B32B 27/10; B32B 27/12; B32B 2255/26; B32B 2270/00; B32B 2307/7145; B32B 2307/7265; B32B 2307/75; B32B 2519/00; B32B 2605/12; B32B 5/024; B32B 15/092; B32B 15/098; B32B 23/08; B32B 27/28; B32B 27/30; B32B 27/302; B32B 27/308; B32B 27/32; B32B 27/365; B32B 2255/10; B32B 27/306; B32B 27/36; B32B 27/38; B32B 27/40; B32B 2307/748; C08K 3/013; C08K 3/36; C08K 5/0058; C08K 5/36; C08K 5/56; C09J 7/29; C09J 7/38; C09J 2301/122; C09J 2203/35; C09J 2301/302; C09J 2301/41; C09J 2483/006; C09J 7/25; C09J 201/00; C08G 77/46; C08G 77/80; B29C 39/148; B29C 59/022; B29C 2059/023; B29K 2063/00; B29K 2075/00; B29K 2083/00; B29L 2031/768
See application file for complete search history.

(56) References Cited

U.S. PATENT DOCUMENTS

| | | |
|---|---|---|
| 4,947,785 A | 8/1990 | Milne |
| 5,017,237 A | 5/1991 | Svensson |
| 2016/0122593 A1 | 5/2016 | Kurata et al. |

FOREIGN PATENT DOCUMENTS

| | | |
|---|---|---|
| CN | 106085070 A | 11/2016 |
| JP | 1-222908 A | 9/1989 |

(Continued)

OTHER PUBLICATIONS

JP-2010077559-A Machine Translation (Year: 2010).*
(Continued)

*Primary Examiner* — Anthony J Green
(74) *Attorney, Agent, or Firm* — Oblon, McClelland, Maier & Neustadt, L.L.P.

(57) ABSTRACT

The present invention provides an antifouling coating film that exhibits suppressed elution of an organism repellent in exposure to a dynamic water flow in water and exhibits an antifouling property for a long time and a method of manufacturing the same, a water-contacting structure with an antifouling coating film, and an antifouling tape and a method of manufacturing the same, and relates to an antifouling coating film containing a binder (A) and an organism repellent (B), having a riblet structure on a surface thereof, the organism repellent (B) containing one or more kind selected from the group consisting of copper pyrithione, zinc pyrithione, 4-bromo-2-(4-chlorophenyl)-5-(trifluoromethyl)-1H-pyrrole-3-carbonitrile, and 4,5-dichloro-2-n-octyl-4-isothiazolin-3-one, and a method of manufacturing the same.

16 Claims, No Drawings

(51) Int. Cl.

| | | |
|---|---|---|
| *A01N 43/80* | (2006.01) | |
| *A01N 59/20* | (2006.01) | |
| *B08B 17/06* | (2006.01) | |
| *B32B 7/12* | (2006.01) | |
| *B32B 27/08* | (2006.01) | |
| *B32B 27/20* | (2006.01) | |
| *B32B 27/28* | (2006.01) | |
| *C08K 3/013* | (2018.01) | |
| *C08K 3/36* | (2006.01) | |
| *C09D 7/61* | (2018.01) | |
| *C09J 7/29* | (2018.01) | |
| *C09J 7/38* | (2018.01) | |

(52) U.S. Cl.
CPC ............ *C09D 5/1687* (2013.01); *C09D 7/61* (2018.01); *C09J 7/29* (2018.01); *C09J 7/38* (2018.01); *B32B 2307/538* (2013.01); *B32B 2307/732* (2013.01)

(56) References Cited

FOREIGN PATENT DOCUMENTS

| JP | 2-503927 A | 11/1990 |
|---|---|---|
| JP | 4-106156 A | 4/1992 |
| JP | 8-268377 A | 10/1996 |
| JP | 2001-114185 A | 4/2001 |
| JP | 2001-139816 A | 5/2001 |
| JP | 2004-182908 A | 7/2004 |
| JP | 2006-233160 A | 9/2006 |
| JP | 2010-77559 A | 4/2010 |
| JP | 2010-242439 A | 10/2010 |
| JP | 2011-530443 A | 12/2011 |
| JP | 2012-508128 A | 4/2012 |
| JP | 2013-515122 A | 5/2013 |
| JP | 2013-155232 A | 8/2013 |
| JP | 2013-155233 A | 8/2013 |
| JP | 2013-194124 A | 9/2013 |
| JP | 2015-28154 A | 2/2015 |
| JP | 2015-224334 A | 12/2015 |
| JP | 2016-124994 A | 7/2016 |
| KR | 10-2016-0101743 A | 8/2016 |
| WO | WO 2012/156485 A1 | 11/2012 |
| WO | WO 2014/084324 A1 | 6/2014 |
| WO | WO 2016/193326 A1 | 12/2016 |
| WO | WO 2017/099180 A1 | 6/2017 |

OTHER PUBLICATIONS

WO-2012156485-A1 Machine Translation (Year: 2012).*
International Search Report dated Jul. 2, 2019 in PCT/JP2019/013278 filed on Mar. 27, 2019, 3 pages.
Extended European Search Report dated Dec. 3, 2021 in European Patent Application No. 197757164, 8 pages.
Combined Chinese Office Action and Search Report dated Jul. 2, 2021 in Chinese Patent Appiication No. 2019800220835, 8 pages.

* cited by examiner

ANTIFOULING COATING FILM AND METHOD OF MANUFACTURING SAME, WATER CONTACTING STRUCTURE WITH ANTIFOULING COATING FILM, AND ANTIFOULING TAPE AND METHOD OF MANUFACTURING SAME

TECHNICAL FIELD

The present invention relates to an antifouling coating film and a method of manufacturing the same, a water-contacting structure with an antifouling coating film, and an antifouling tape and a method of manufacturing the same.

BACKGROUND ART

A surface of a structure that is brought into contact with water, i.e., a water-contacting structure, such as a ship, a fishing gear, and a water pipe, is exposed to a risk of economic losses due to appearance deterioration and increase of water flow resistance caused by attachment of aquatic organisms. The measure that has been generally employed for preventing the attachment of aquatic organisms is to cover the surface of the water-contacting structure with a coating film having a function of preventing or reducing the attachment of aquatic organisms, i.e., an antifouling coating film Representative examples of the antifouling coating film include a coating film containing an organism repellent, and a method of using, as a binder for forming a coating film, a curable organosiloxane capable of inhibiting the attachment of aquatic organisms by utilizing the low surface free energy thereof. Techniques combining the aforementioned methods have also been developed, and for example, PTL 1 proposes a fouling suppressing coating composition containing a binder containing a polysiloxane as a base material, a hydrophilic modified polysiloxane having a polysiloxane main chain modified with a hydrophilic oligomer, and a biocide.

In the case where friction arises between a surface of a structure and a liquid, for example, in the case where a water-contacting structure, such as a ship, travels on water, or in the case where a liquid is transported through a tubular structure, such as a pipeline, large energy is consumed by the frictional resistance. Attempts have been widely made for reducing the frictional resistance for the improvement of the energy efficiency, and examples of the effective measure among them include a method using a surface microstructure, which may be referred to as a riblet structure. As the technique using the riblet structure, PTL 2 proposes a ship outer hull that has formed thereon fine grooves along the flowing direction of marine water and is subjected to an antifouling treatment, and PTL 3 proposes a surface structure of a liquid-contacting structure that is covered with a large number of fine grooves formed with a water-repelling material, disposed in parallel to the flow direction of a liquid.

CITATION LIST

Patent Literatures

PTL 1: JP 2013-515122 A
PTL 2: JP 2001-114185 A
PTL 3: JP 8-268377 A

SUMMARY OF INVENTION

Technical Problem

The antifouling coating film containing an organism repellent described above can provide a good antifouling property through the release of the organism repellent in water at a proper rate, and a too large release rate (elution rate) of the organism repellent in water makes difficult the achievement of the long-term antifouling property. The elution rate is influenced by the strength of the water flow, to which the coating film is exposed in water in use. Specifically, in the case where the coating film is exposed to a dynamic water flow, the release of the organism repellent into water is larger than the case of a static condition, and the elution rate is increased in proportion to the strength of the water flow. However, the underwater environment where the antifouling coating film is used undergoes changes in weather, tidal currents, pressure, and the like, which are hardly expected at the time of design, and the water flow, to which the coating film is exposed, also changes depending on the environment and the time in use. Consequently, the elution rate of the organism repellent from the antifouling coating film is influenced by these uncertain factors, resulting in a problem making difficult the design of an antifouling coating film containing an organism repellent.

The present invention has been made to solve the problem, and an object thereof is to provide an antifouling coating film that exhibits suppressed elution of an organism repellent in exposure to a dynamic water flow in water and exhibits an antifouling property for a long time and a method of manufacturing the same, a water-contacting structure with an antifouling coating film, and an antifouling tape and a method of manufacturing the same.

Solution to Problem

As a result of the earnest studies on the problem, the present inventors have found that the formation of a riblet structure on a surface of an antifouling coating film containing a binder and a particular organism repellent can reduce the influence of a water flow against the antifouling coating film on the elution rate of the organism repellent, and thus have completed the present invention.

The substances of the present invention are as follows.

The present invention relates to the following items [1] to [14].

[1] An antifouling coating film containing a binder (A) and an organism repellent (B), having a riblet structure on a surface thereof, the organism repellent (B) containing one or more kind selected from the group consisting of copper pyrithione, zinc pyrithione, 4-bromo-2-(4-chlorophenyl)-5-(trifluoromethyl)-1H-pyrrole-3-carbonitrile, and 4,5-dichloro-2-n-octyl-4-isothiazolin-3-one.

[2] The antifouling coating film according to the item [1], wherein the antifouling coating film formed with an antifouling coating composition containing a binder forming component (a) and the organism repellent (B).

[3] The antifouling coating film according to the item [2], wherein the binder forming component (a) contains a curable organopolysiloxane.

[4] The antifouling coating film according to any one of the items [1] to [3], wherein the antifouling coating film and/or the antifouling coating composition further contains a slip agent (C).

[5] The antifouling coating film according to the item [4], wherein the slip agent (C) contains one or more kind selected from the group consisting of a silicone oil (C1) and a polymer (C2) containing a constituent unit derived from a hydrophilic group-containing unsaturated monomer.

[6] The antifouling coating film according to any one of the items [1] to [5], wherein the riblet structure includes a groove structure.

[7] The antifouling coating film according to any one of the items [1] to [6], wherein the riblet structure has a riblet height of 1 to 100 μm.

[8] The antifouling coating film according to any one of the items [1] to [7], wherein the antifouling coating film and/or the antifouling coating composition further contains an inorganic filler (D).

[9] The antifouling coating film according to the item [8], wherein the inorganic filler (D) contains silica, and the silica is mixed in the antifouling coating composition in the form of a kneaded product with the curable organopolysiloxane.

[10] The antifouling coating film according to any one of the items [1] to [9], wherein the organism repellent (B) contains one or more kind selected from the group consisting of copper pyrithione and zinc pyrithione.

[11] A method of manufacturing the antifouling coating film according to any one of the items [1] to [10], the method of manufacturing the antifouling coating film, including transferring a surface shape of a mold having the riblet structure to the surface of the antifouling coating film, or forming the antifouling coating film on a substrate or a coating film having the riblet structure, so as to form the riblet structure on a surface of the antifouling coating film.

[12] A water-contacting structure with an antifouling coating film including a water-contacting structure having on at least a part of a surface thereof the antifouling coating film according to any one of the items [1] to [10].

[13] An antifouling tape including an antifouling layer containing the antifouling coating film according to any one of the items [1] to [10] and a pressure-sensitive adhesive layer, the antifouling layer and the pressure-sensitive adhesive layer being laminated directly or via an optional intermediate layer, the antifouling layer having the riblet structure at least on a surface opposite to the pressure-sensitive adhesive layer.

[14] A method of manufacturing the antifouling tape according to the item [13], the method of manufacturing the antifouling tape, including transferring a surface shape of a mold having a negative structure of the riblet structure to a surface of the antifouling layer, or forming a substrate layer having the riblet structure and forming the antifouling layer on the substrate layer, so as to form the riblet structure on a surface of the antifouling layer opposite to the substrate layer.

Advantageous Effects of Invention

According to the present invention, an antifouling coating film that exhibits suppressed elution of an organism repellent in exposure to a dynamic water flow in water, and exhibits an antifouling property for a long time can be provided. According to the present invention, furthermore, a method of manufacturing the antifouling coating film, a water-contacting structure with an antifouling coating film, and an antifouling tape and a method of manufacturing the same can be provided.

DESCRIPTION OF EMBODIMENTS

The antifouling coating film, the method of manufacturing the antifouling coating film, the water-contacting structure with an antifouling coating film, the antifouling tape, and the method of manufacturing the antifouling tape according to the present invention will be described below.

[Antifouling Coating Film]

The antifouling coating film of the present invention contains a binder (A) and an organism repellent (B), and has a riblet structure on a surface thereof.

According to the present invention, the release of the organism repellent (B) under an environment with exposure to a dynamic water flow is suppressed to provide an antifouling coating film having an excellent sustained release property.

While the mechanism that the elution of the organism repellent (B) is suppressed to provide the sustained release property of the antifouling coating film of the present invention is not necessarily clear, a part thereof can be estimated as follows. In an antifouling coating film formed on a surface of a water-contacting structure, while it is considered that water penetrates from the surface of the coating film into the skeleton formed of the binder (A) to cause elution of the organism repellent (B) from the antifouling coating film through diffusion of the organism repellent (B), the elution rate of the organism repellent (B) is larger when the surface of the coating film is exposed to a water flow, and the elution is accelerated when the water flow is larger. In the case where the coating film has the riblet structure on the surface thereof, on the other hand, it is estimated that the effect of decreasing the influence of the water flow is obtained due to the contribution of the turbulence control of the fluid and the like in the vicinity of the surface, and consequently the elution of the organism repellent (B) in the coating film is suppressed as compared to the case where the surface has no riblet structure, resulting in the sustained release property.

The riblet structure referred in the description herein is a fine concavity and convexity shape having a periodic structure, and in the case where a fluid is in contact with a surface of an article, the riblet structure formed on the surface of the article constitutes a structure that exhibits an effect of suppressing the occurrence of a turbulence flow of the fluid.

Examples of the riblet structure include the groove structure described in JP 2011-530443 A and the structure having the particular periodic pattern described in JP 2012-508128 A, and a structure having a groove structure is preferred from the standpoint of the convenience in the production of the structure.

The riblet structure may be characterized by the difference between the heights of the concavity and convexity, i.e., the riblet height. In the description herein, the 10-point average roughness Rzjis (JIS B0601:2001) of the surface on an arbitrary cross section of the surface having the riblet formed thereon in an arbitrary range where the periodic concavity and convexity can be recognized is designated as the riblet height h. The riblet height h of the antifouling coating film of the present invention is preferably 0.1 to 1,000 μm, more preferably 0.5 to 500 μm, further preferably 1 to 100 μm, still further preferably 10 to 100 μm, and particularly preferably 15 to 100 μm, from the standpoint of the suppression of the elution of the organism repellent from the coating film and the standpoint of the convenience in the formation of the riblet structure.

In the case where the riblet structure is a groove structure, examples thereof include structures of V-shaped grooves, U-shaped grooves, rectangular grooves, and trapezoidal grooves. The average distance between the tops of the concavity and convexity in the direction perpendicular to the longitudinal direction of the groove structure, i.e., the pitch S (μm) of the groove structure, is preferably 0.5 to 5, more preferably 0.8 to 4, further preferably 1.0 to 3.5, and still further preferably 1.1 to 3.5, in terms of ratio S/h in relation to the riblet height h, from the same standpoints as above.

The riblet structure preferably has a riblet height h of 0.5 to 500 μm and a ratio S/h of 0.5 to 5, more preferably a riblet height h of 1 to 100 μm and a ratio S/h of 0.8 to 4, further preferably a riblet height h of 10 to 100 μm and a ratio S/h of 1.0 to 3.5, and still further preferably a riblet height h of 15 to 100 μm and a ratio S/h of 1.1 to 3.5, from the same standpoints as above.

In the case where the riblet structure on the surface of the antifouling coating film of the present invention is a groove structure, and the antifouling coating film is applied to a purpose with exposure to a dynamic water flow, the longitudinal direction of the riblet grooves with respect to the flow direction of the dynamic water flow may be any of the horizontal direction and the perpendicular direction, and is preferably the horizontal direction from the standpoint that the effect of decreasing the frictional resistance to the water flow is expected by the riblet structure.

The components of the antifouling coating composition of the present invention will be described below.

The antifouling coating composition of the present invention is preferably formed of an antifouling coating composition (which may be hereinafter referred simply to as a "coating composition") containing a binder forming component (a) and the organism repellent (B).

<Binder (A)>

The antifouling coating film of the present invention contains a binder (A) for the purpose of forming the skeleton of the coating film.

The antifouling coating composition according to the present invention preferably contains a binder forming component (a) as a component contained as the binder (A) in the coating film.

It suffices that the binder forming component (a) contained in the antifouling coating composition forms the binder (A) in the coating film and enables the elution of the organism repellent (B) described later from the surface of the coating film, and may be either a reaction curing type or a thermoplastic type.

The reaction curing type binder forms the binder (A) through curing reaction of the binder forming component (a), so as to form the coating film, and examples thereof include a silicone resin type, an epoxy resin type, and a polyurethane resin type. Examples of the thermoplastic binder include such a material that the binder (A) itself as the binder forming component (a) is dissolved in a solvent or the like in the antifouling coating composition, and the coating film is formed through evaporation of the solvent or heating, and examples thereof include an acrylic type, a vinyl type, and a polyester type. Among these, the antifouling coating film of the present invention preferably contains the reaction curing type binder as the binder (A), and more preferably contains a silicone resin type binder, from the standpoint of the improvement of the antifouling property of the antifouling coating film and the achievement of the excellent sustained release property of the organism repellent (B) described later.

The binder forming component (a) is not particularly limited, as far as the material forms the binder (A), and is preferably the material forming the reaction curing binder, and more preferably a material forming a silicone resin type binder. The binder forming component (a) may be used alone or as a combination of two or more kinds thereof.

In the case where the binder (A) contained in the antifouling coating film of the present invention is the silicone resin type binder, the antifouling coating composition according to the present invention generally contains a curable organopolysiloxane as the binder forming component (a). Accordingly, the binder forming component (a) preferably contains a curable organopolysiloxane.

The content of the curable organopolysiloxane in the binder forming component (a) is preferably 50% by mass or more, more preferably 80% by mass or more, and further preferably 95% by mass or more, from the standpoint of the suppression of the elution of the organism repellent from the antifouling coating film and the standpoint of the enhancement of the antifouling property of the coating film. The upper limit of the content thereof is not particularly limited, and thus is 100% by mass. The binder forming component (a) may be formed only of the curable organopolysiloxane.

Examples of the curable organopolysiloxane include ones that are cured by forming a three-dimensional crosslinked structure through the reaction among the reactive groups contained in the molecule thereof or the reaction between the reactive group contained therein and the reactive group of the organosilicon crosslinking agent (F) described later. Examples of the reaction of the reactive group include condensation reaction and addition reaction, and examples of the condensation reaction include dealcoholization reaction, deoximation reaction, and deacetonation reaction.

The curable organopolysiloxane is preferably one that forms silicone rubber in curing, and for example, a compound represented by the following formula (A1) is preferred, from the standpoint of the suppression of the elution of the organism repellent from the antifouling coating film, the standpoint of the easiness in the formation of the riblet structure, the standpoint of the workability in adhering the coating film, and the like.

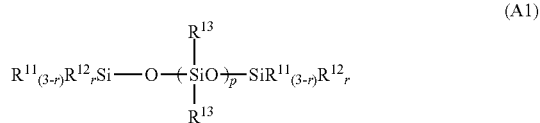

(A1)

In the formula (A1), $R^{11}$ and $R^{13}$ each independently represent a hydrogen atom, an alkyl group having 1 to 16 carbon atoms, an alkenyl group having 2 to 16 carbon atoms, an aryl group having 6 to 16 carbon atoms, an aralkyl group having 7 to 16 carbon atoms, or a halogenated alkyl group having 1 to 16 carbon atoms; $R^{12}$ each independently represent a hydroxy group or a hydrolyzable group; r represents an integer of 1 to 3; and p represents 10 to 10,000.

In the formula (A1), $R^{11}$ and $R^{13}$ each independently represent a hydrogen atom, an alkyl group having 1 to 16 carbon atoms, an alkenyl group having 2 to 16 carbon atoms, an aryl group having 6 to 16 carbon atoms, an aralkyl group having 7 to 16 carbon atoms, or a halogenated alkyl group having 1 to 16 carbon atoms.

The alkyl group having 1 to 16 carbon atoms represented by $R^{11}$ and $R^{13}$ may be linear or branched, and examples thereof include a methyl group, an ethyl group, a propyl group, a butyl group, a pentyl group, a hexyl group, a heptyl group, an octyl group, a decyl group, a dodecyl group, and a hexadecyl group.

The alkenyl group having 2 to 16 carbon atoms represented by $R^{11}$ and $R^{13}$ may be linear, branched, or cyclic, and examples thereof include a vinyl group, an allyl group, a propenyl group, an isopropenyl group, a butenyl group, an isobutenyl group, a pentenyl group, a heptenyl group, a hexenyl group, a cyclohexenyl group, an octenyl group, a decenyl group, and a dodecenyl group.

The aryl group having 6 to 16 carbon atoms represented by $R^{11}$ and $R^{13}$ may have a substituent such as an alkyl group on the aromatic ring, and examples thereof include a phenyl group, a tolyl group (i.e., a methylphenyl group), a xylyl group (i.e., a dimethylphenyl group), and a naphthyl group.

Examples of the aralkyl group having 7 to 16 carbon atoms represented by $R^{11}$ and $R^{13}$ include a benzyl group, a 2-phenylethyl group, a 2-naphthylethyl group, and a diphenylmethyl group.

Examples of the halogenated alkyl group having 1 to 16 carbon atoms represented by $R^{11}$ and $R^{13}$ include the groups exemplified above for the alkyl group, in which the hydrogen atoms thereof are partially or completely substituted by a halogen atom, such as a fluorine atom, a chlorine atom, a bromine atom, and an iodine atom.

Among these, $R^{11}$ in the formula (A1) preferably represents a hydrogen atom, the alkyl group, the alkenyl group, or the aryl group, more preferably a methyl group, an ethyl group, a vinyl group, or a phenyl group, and further preferably a methyl group or a vinyl group.

$R^{13}$ in the formula (A1) preferably represents a hydrogen atom, the alkyl group, the alkenyl group, or the aryl group, more preferably a methyl group, an ethyl group, a vinyl group, or a phenyl group, further preferably a methyl group, an ethyl group, or a phenyl group, and still further preferably a methyl group or a phenyl group.

The plural groups represented by $R^{13}$ may be the same as or different from each other. In the case where there are plural groups represented by $R^{11}$, the groups may be the same as or different from each other.

In the formula (A1), $R^{12}$ each independently represent a hydroxy group or a hydrolyzable group.

Examples of the hydrolyzable group represented by $R^{12}$ include an oxime group, an acyloxy group, an alkoxy group, an alkenyloxy group, an amino group, an amide group, and an aminooxy group.

The oxime group represented by $R^{12}$ is preferably an oxime group having 1 to 10 carbon atoms, and examples thereof include a dimethyl ketoxime group, a methyl ethyl ketoxime group, a diethyl ketoxime group, and a methyl isopropyl ketoxime group.

The acyloxy group (RC(=O)O—) represented by $R^{12}$ is preferably an aliphatic acyloxy group having 1 to 10 carbon atoms or an aromatic acyloxy group having 7 to 12 carbon atoms, and examples thereof include an acetoxy group, a propionyloxy group, a butyryloxy group, and a benzoyloxy group.

The alkoxy group represented by $R^{12}$ is preferably an alkoxy group having 1 to 10 carbon atoms. In the alkoxy group represented by $R^{12}$, an ether group (—O—) may intervene between the carbon-carbon bonds of the alkyl chain.

Specific examples of the alkoxy group represented by $R^{12}$ include a methoxy group, an ethoxy group, a propoxy group, a butoxy group, a methoxyethoxy group, and an ethoxyethoxy group.

The alkenyloxy group represented by $R^{12}$ is preferably an alkenyloxy group having 3 to 10 carbon atoms, and examples thereof include an isopropenyloxy group, an isobutenyloxy group, and a 1-ethyl-2-methylvinyloxy group.

The amino group represented by $R^{12}$ may be any of a primary amino group, a secondary amino group, and a tertiary amino group, and among these, a secondary amino group and a tertiary amino group are preferred, and an amino group having 1 to 10 carbon atoms is more preferred. Examples of the preferred amino group include an N-methylamino group, an N-ethylamino group, an N-propylamino group, an N-butylamino group, an N,N-dimethylamino group, an N,N-diethylamino group, and an N-cyclohexylamino group.

In the description herein, the primary amino group means a group represented by —$NH_2$, the secondary amino group means a group obtained by substituting one hydrogen atom of —$NH_2$ with an alkyl group or the like, and the tertiary amino group means a group obtained by substituting two hydrogen atoms of —$NH_2$ with an alkyl group or the like.

The amide group represented by $R^{12}$ is preferably an amide group having 2 to 10 carbon atoms, and examples thereof include an N-methylacetamide group, an N-ethylacetamide group, and an N-methylbenzamide group.

The aminooxy group represented by $R^{12}$ is preferably an aminooxy group having 2 to 10 carbon atoms, and examples thereof include an N,N-dimethylaminooxy group and an N,N-diethylaminooxy group.

Among these, $R^{12}$ in the formula (A1) preferably represents a hydroxy group, an oxime group, or an alkoxy group, more preferably a hydroxy group or an oxime group, and further preferably a hydroxy group or a methyl ethyl ketoxime group.

The plural groups represented by $R^{12}$ may be the same as or different from each other.

In the formula (A1), r represents an integer of 1 to 3.

In the case where the $R^{12}$ is a hydroxy group, r preferably represents 1, and in the case where $R^{12}$ is a substituent other than a hydroxy group, r preferably represents 2.

In the formula (A1), p represents 10 to 10,000, and preferably 100 to 1,000, and may be appropriately controlled to satisfy the following weight average molecular weight.

p means the average repeating number of —($SiR^{13}_2$—O)—.

The weight average molecular weight (Mw) of the curable organopolysiloxane is preferably 500 or more, more preferably 5,000 or more, further preferably 10,000 or more, still further preferably 15,000 or more, and still more further preferably 20,000 or more, and is preferably 1,000,000 or less, more preferably 100,000 or less, further preferably 50,000 or less, and still further preferably 40,000 or less, from the standpoint of the enhancement of the workability in the production of the coating composition, and the standpoint of the enhancement of the coating workability and the curability of the coating composition and the strength and the flexibility of the formed coating film.

In the present invention, the "weight average molecular weight (Mw)" of the curable organopolysiloxane, the polymer (C2) containing a constituent unit derived from the hydrophilic group-containing unsaturated monomer described later, and the like is obtained by measuring by GPC (gel permeation chromatography) and calculating by conversion with the standard polystyrene having known molecular weights.

The viscosity at 23° C. of the curable organopolysiloxane is preferably 20 mPa·s or more, more preferably 100 mPa·s or more, and further preferably 500 mPa·s or more, and is preferably 100,000 mPa·s or less, more preferably 10,000 mPa·s or less, and further preferably 5,000 mPa·s or less, from the standpoint of the enhancement of the workability in the production of the coating composition, and the standpoint of the enhancement of the coating workability and the curability of the coating composition and the strength and the flexibility of the formed coating film.

In the description herein, the viscosity at 23° C. of the curable organopolysiloxane means a viscosity measured with a B-type rotary viscometer (for example, Model BM, manufactured by Tokyo Keiki, Inc.).

In the case where the antifouling coating composition according to the present invention contains the curable organopolysiloxane, the content of the curable organopolysiloxane in the coating composition is preferably 10% by mass or more, more preferably 20% by mass or more, and further preferably 30% by mass or more, and is preferably 90% by mass or less, more preferably 80% by mass or less, and further preferably 70% by mass or less, from the standpoint of the enhancement of the strength and the flexibility of the formed coating film.

The content of the curable organopolysiloxane in the solid content of the coating composition is preferably 15% by mass or more, more preferably 25% by mass or more, and further preferably 35% by mass or more, and is preferably 95% by mass or less, more preferably 85% by mass or less, and further preferably 75% by mass or less, from the same standpoints as above.

In the description herein, the "solid content of the coating composition" means the component except for the organic solvent (J) described later and the volatile components contained in the components as a solvent, and the "content in the solid content of the coating composition" can be calculated as a content in a solid content obtained by drying the coating composition in a hot air dryer at 125° C. for 1 hour.

The curable organopolysiloxane used may be a commercially available product. Examples of the commercially available product include "DMS-S35", manufactured by Gelest, Inc., and "KE-445", manufactured by Shin-Etsu Chemical Co., Ltd. The curable organopolysiloxane used may be one described in JP 2001-139816 A.

<Organism Repellent (B)>

The antifouling coating film of the present invention and the antifouling coating composition for forming the antifouling coating film contain an organism repellent (B) for the purpose of enhancing the antifouling property of the formed antifouling coating film.

The organism repellent (B) is eluted from the antifouling coating film in water, and has an effect of suppressing the attachment of aquatic organisms to the coating film surface of the antifouling coating film and enhancing the antifouling property.

The organism repellent (B) has a repelling effect against aquatic organisms, exhibits a certain elution rate into water, and contains one or more kind selected from the group consisting of copper pyrithione, zinc pyrithione, 4-bromo-2-(4-chlorophenyl)-5-(trifluoromethyl)-1H-pyrrole-3-carbonitrile (which is also referred to as tralopyril), and 4,5-dichloro-2-n-octyl-4-isothiazolin-3-one (which is also referred to as DCOIT). These organism repellents (B) may be used alone or as a combination of two or more kinds thereof.

Examples of the copper pyrithione include a compound represented by the following formula (B1), wherein M represents Cu, and examples of the zinc pyrithione include a compound represented by the following formula (B1), wherein M represents Zn.

Among these, one or more kind selected from the group consisting of copper pyrithione and zinc pyrithione is preferably contained from the standpoint of the achievement of the excellent elution property from the formed antifouling coating film, the standpoint of the antifouling property to a wide range of organisms, the standpoint of the convenience in the formation of the coating film, the standpoint of the workability in adhering the coating film, the standpoint of the enhancement of the strength and the flexibility of the coating film, and the like, and copper pyrithione is more preferably contained from the standpoint of the appropriate elution rate thereof.

The content of the organism repellent (B) in the antifouling coating composition according to the present invention is preferably 0.03% by mass or more, and more preferably 0.5% by mass or more, and is preferably 30% by mass or less, and more preferably 20% by mass or less, from the standpoint of the enhancement of the antifouling property of the formed antifouling coating film.

The content of the organism repellent (B) in the antifouling coating film of the present invention is preferably 0.05% by mass or more, and more preferably 1% by mass or more, and is preferably 50% by mass or less, and more preferably 30% by mass or less, from the standpoint of the enhancement of the strength and the flexibility of the formed antifouling coating film.

The preferred ranges of the content of the organism repellent (B) in the solid content of the antifouling coating composition for forming the antifouling coating film of the present invention are the same as the preferred ranges of the content thereof in the antifouling coating film.

The antifouling coating film of the present invention and the antifouling coating composition according to the present invention may contain an organism repellent other than the organism repellent (B) (which may be hereinafter referred to as an additional organism repellent) in addition to the organism repellent (B). The additional organism repellent may be used alone or as a combination of two or more kinds thereof, and examples thereof include cuprous oxide, copper rhodanide, copper, a pyrithione salt other than copper pyrithione and zinc pyrithione, a boran-nitrogen base adduct (such as pyridine triphenylborane and 4-isopropylpyridine diphenylmethylborane), (+/−)-4-[1-(2,3-dimethylphenyl)ethyl]-1H-imidazole (which is also referred to as medetomidine), N,N-dimethyl-N'-(3,4-dichlorophenyl)urea, N-(2,4,6-trichlorophenyl)maleimide, 2-methylthio-4-tert-butylamino-6-cyclopropylamino-1,3,5-triazine, 2,4,5,6-tetrachloroisophthalonitrile, bis dimethyldithiocarbamoylzinc ethylenebisdithiocarbamate, chloromethyl-n-octyl disulfide, N,N-dimethyl-N'-phenyl-(N'-fluorodichloromethylthio) sulfamide, tetraalkylthiuram disulfide, zinc dimethyldithiocarbamate, zinc ethylenebisdithiocarbamate, 2,3-dichloro-N-(2',6'-diethylphenyl)maleimide, and 2,3-dichloro-N-(2'-ethyl-6'-methylphenyl)maleimide.

Examples of the pyrithione salt other than copper pyrithione and zinc pyrithione include a compound represented by the following general formula (B1).

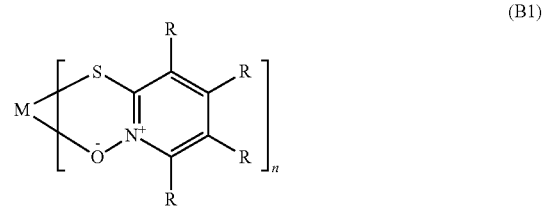

(B1)

In the formula (B1), R each independently represent a hydrogen atom, an alkyl group having 1 to 6 carbon atoms, a cycloalkyl group having 3 to 6 carbon atoms, an alkenyl group having 2 to 6 carbon atoms, a phenyl group, an alkoxy group having 1 to 6 carbon atoms, or a halogenated alkyl group having 1 to 6 carbon atoms; M represents a metal atom of Na, Mg, Ca, Ba, Fe, or Sr; and n represents a valence number of the metal atom M.

The content ratio of the organism repellent (B) with respect to the total of the organism repellents is preferably 50% by mass or more, more preferably 80% by mass or more, and further preferably 95% by mass or more. The upper limit of the content is not particularly limited, and thus is 100% by mass.

The content ratio of one or more kind selected from the group consisting of copper pyrithione and zinc pyrithione with respect to the total of the organism repellents is preferably 50% by mass or more, more preferably 80% by mass or more, and further preferably 95% by mass or more, from the standpoint of the properties of the formed antifouling coating film, the convenience in the formation of the coating film, the workability in adhering the coating film, and the like. The upper limit of the content is not particularly limited, and thus is 100% by mass.

<Optional Components>

The antifouling coating film of the present invention may contain, in addition to the binder (A) and the organism repellent (B), a slip agent (C), an inorganic filler (D), a silane coupling agent (E), an organosilicon crosslinking agent (F), a curing catalyst (G), a dehydrating agent (H), a coloring pigment (I), an anti-sagging and anti-settling agent (K), an enzyme (L), a flame retardant (M), a thermal conductivity improver (N), and the like, depending on necessity.

The antifouling coating composition according to the present invention may contain, in addition to the binder forming component (a) and the organism repellent (B), a slip agent (C), an inorganic filler (D), a silane coupling agent (E), an organosilicon crosslinking agent (F), a curing catalyst (G), a dehydrating agent (H), a coloring pigment (I), an organic solvent (J), an anti-sagging and anti-settling agent (K), an enzyme (L), a flame retardant (M), a thermal conductivity improver (N), and the like, depending on necessity.

[Slip Agent (C)]

The antifouling coating film of the present invention and the antifouling coating composition for forming the antifouling coating film may contain a slip agent (C).

The slip agent (C) is not particularly limited, as far as it is in a liquid state at 23° C. and impairs the attachment of aquatic organisms to the antifouling coating film by imparting slip property to the antifouling coating film. In the case where the antifouling coating film of the present invention contains the slip agent (C), an effect of improving the workability in the formation of the coating film and the releasability from a mold having a negative structure of the riblet structure can also be obtained.

The slip agent (C) preferably contains one or more kind selected from the group consisting of a silicone oil (C1) and a polymer (C2) containing a constituent unit derived from a hydrophilic group-containing unsaturated monomer from the standpoint of the antifouling property of the antifouling coating film and the standpoint of the improvement of the workability in the formation of the coating film, and more preferably contains the silicone oil (C1) from the standpoint of the suppression of the elution of the organism repellent from the antifouling coating film.

Furthermore, the polymer (C2) containing a constituent unit derived from a hydrophilic group-containing unsaturated monomer is more preferably contained from the standpoint of the convenience in the formation of the antifouling coating film, the releasability from a mold having a negative structure of the riblet structure, and the interlayer adhesiveness to the substrate layer, the intermediate layer, the pressure-sensitive adhesive layer, and the like, the standpoint of the prevention of contamination of a production apparatus of the coating film with the antifouling coating composition in coating, the standpoint of the workability in adhering the antifouling coating film, and the like. The slip agent (C) may be used alone or as a combination of two or more kinds thereof.

[Silicone Oil (C1)]

The silicone oil (C1) is an oil containing polyorganosiloxane in the polymer main chain, and a silicone oil represented by the following formula (C1) is preferred.

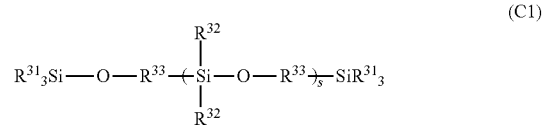

(C1)

In the formula (C1), $R^{31}$ and $R^{32}$ each independently represent a hydrogen atom, or an alkyl group, an alkenyl group, an aryl group, an aralkyl group, or a halogenated alkyl group, each of which have 1 to 50 carbon atoms, and may contain a group having a hetero atom in the structure thereof; $R^{33}$ represents a single bond, or a divalent hydrocarbon group having 1 to 50 carbon atoms, which may have intervening therein a group having a hetero atom; and s represents an integer of 10 to 1,000.

In the case where $R^{31}$ and $R^{32}$ each represent an alkyl group, an alkenyl group, an aryl group, an aralkyl group, or a halogenated alkyl group, each of which have 1 to 50 carbon atoms, these groups each independently may be a group containing a group having a hetero atom in the structure thereof.

Examples of the hetero atom include an oxygen atom, a nitrogen atom, and a sulfur atom.

Examples of the group having a hetero atom include an ether group, a thioether group, an ester group, an amino group, an amide group, a hydroxy group, a carboxy group, and a thiol group. Examples of the group containing a group having a hetero atom in the structure thereof, for example, in the case where the group is an alkyl group, include a group having a group having a hetero atom intervening between the carbon-carbon bonds of the alkyl group, and a group obtained by substituting a hydrogen atom of the alkyl group by a group having a hetero atom. One kind or two or more kinds of the group having a hetero atom may be contained, and in the case where there are plural groups each having a hetero atom, the groups may be the same as or different from each other.

The plural groups represented by $R^{31}$ and $R^{32}$ may be the same as or different from each other.

The silicone oil (C1) is preferably a silicone oil, in which $R^{3'}$ and $R^{32}$ are constituted only by an alkyl group, or constituted by an alkyl group and an aryl group.

The silicone oil (C1), in which $R^{31}$ and $R^{32}$ are constituted only by an alkyl group, is preferably a silicone oil, in which the plural groups represented by $R^{31}$ and $R^{32}$ are all constituted by methyl groups, or a silicon oil, in which the groups are constituted by a methyl group and an alkyl group other than a methyl group, and more preferably a silicon oil, in which the groups are all constituted by methyl groups, or a silicon oil, in which the groups are constituted by a methyl group and an alkyl group having an ether group.

In the following description, the silicon oil (C1), in which the plural groups represented by $R^{31}$ and $R^{32}$ are all constituted by methyl groups, may be referred to as a "polydimethylsiloxane (unmodified)".

Examples of the alkyl group having an ether group include a group having the following chemical structure.

$$—R^{34}(C_2H_4O)_a(C_3H_6O)_bR^{35}$$

wherein $R^{34}$ represents an alkylene group having 1 to 20 carbon atoms; $R^{35}$ represents an alkyl group having 1 to 20 carbon atoms; and a and b each independently represent an integer of 0 to 30, provided that a+b is an integer of 1 or more.

In the following description, the silicone oil (C1), in which $R^{31}$ and $R^{32}$ are constituted by a methyl group and an alkyl group having an ether group, may be referred to as an "ether-modified polydimethylsiloxane".

The silicone oil (C1), in which $R^{31}$ and $R^{32}$ are constituted by an alkyl group and an aryl group, is preferably a silicone oil, in which $R^{31}$ and $R^{32}$ are constituted by a methyl group and a phenyl group, and more preferably a silicone oil having a ratio of a phenyl group occupied in all $R^{31}$ and $R^{32}$ (i.e., a phenyl modification rate) of 3 to 50%, from the standpoint of the suppression of the elution of the organism repellent from the antifouling coating film and the standpoint of improvement of workability in the formation of the coating film.

In the following description, the silicone oil (C1), in which $R^{31}$ and $R^{32}$ are constituted by a methyl group and a phenyl group, may be referred to as a "phenyl-modified polydimethylsiloxane".

In the formula (C1), $R^{33}$ represents a single bond, or a divalent hydrocarbon group having 1 to 50 carbon atoms, which may have intervening therein a group having a hetero atom. Examples of the group having a hetero atom include a group represented by —$NR^a$— (wherein $R^a$ represents a hydrogen atom or a monovalent hydrocarbon group having 1 to 10 carbon atoms), an ether group, a thioether group (—S—), an ester group (—C(=O)—O—), and an amide group (—C(=O)—$NR^b$—, wherein $R^b$ represents a hydrogen atom or a monovalent hydrocarbon group having 1 to 10 carbon atoms). The group having a hetero atom represented by $R^{33}$ may be a single group or may contain two or more kinds thereof, and there are plural groups of the group having a hetero atom, the groups may be the same as or different from each other.

In the formula (C1), examples of the divalent hydrocarbon group having 1 to 50 carbon atoms represented by $R^{33}$ include a linear or branched alkylene group having 1 to 50 carbon atoms. Examples of the linear alkylene group include a methylene group, an ethylene group, a trimethylene group, a tetramethylene group, a hexamethylene group, an octamethylene group, a decamethylene group, a dodecamethylene group, a tetradecamethylene group, a hexadecamethylene group, an octadecamethylene group, and an icosalene group. Examples of the branched alkyl group include a propylene group, an isopropylene group, an isobutylene group, a 2-methyltrimethylene group, an isopentylene group, an isohexylene group, an isooctylene group, a 2-ethylhexylene group, and an isodecylene group.

The plural groups represented by $R^{33}$ may be the same as or different from each other.

$R^{33}$ preferably represents a single bond. In the case where $R^{33}$ represents a divalent hydrocarbon group having from 1 to 50 carbon atoms and having intervening therein an ether group, examples thereof include a group having the following chemical structure.

$$—R^{36}(C_2H_4O)_a(C_3H_6O)_bR^{37}—$$

wherein $R^{36}$ and $R^{37}$ each independently represent an alkylene group having 1 to 10 carbon atoms; and a and b each independently represent an integer of 0 to 30, provided that a+b is an integer of 1 or more.

In the present invention, the "hydrocarbon group" means a group formed only of carbon and hydrogen unless otherwise indicated, and encompasses saturated or unsaturated, linear or branched aliphatic groups, alicyclic groups, and aromatic groups.

The viscosity at 23° C. of the silicon oil (C1) is preferably 10 mPa·s or more, more preferably 20 mPa·s or more, further preferably 40 mPa·s or more, still further preferably 60 mPa·s or more, and still more further preferably 80 mPa·s or more, and is preferably 10,000 mPa·s or less, more preferably 5,000 mPa·s or less, and further preferably 4,000 mPa·s or less, from the standpoint of the enhancement of the workability in the production of the coating composition, and the standpoint of the enhancement of the coating workability and the curability of the coating composition and the strength and the flexibility of the formed coating film.

In the description herein, the viscosity at 23° C. of the silicone oil (C1) means a viscosity measured with a B-type rotary viscometer.

The antifouling coating film of the present invention and the antifouling coating composition for forming the antifouling coating film preferably contains one or more kind selected from the group consisting of the ether-modified polydimethylsiloxane and the phenyl-modified polydimethylsiloxane, and more preferably contains the ether-modified polydimethylsiloxane, as the silicone oil (C1), from the standpoint of the suppression of the elution of the organism repellent from the antifouling coating film, the standpoint of the improvement of the workability in the formation of the coating film, and the like. The silicone oil (C1) may be used alone or as a combination of two or more kinds thereof.

In the case where the antifouling coating film of the present invention contains the silicone oil (C1), the content of the silicone oil (C1) in the antifouling coating film is preferably 0.1% by mass or more, more preferably 1% by mass or more, and further preferably 3% by mass or more, and is preferably 50% by mass or less, more preferably 40% by mass or less, and further preferably 30% by mass or less, from the standpoint of the enhancement of the antifouling property of the formed antifouling coating film, the standpoint of the suppression of the elution of the organism repellent from the antifouling coating film, the standpoint of the improvement of the workability in the formation of the coating film, and the like.

The preferred ranges of the content of the silicone oil (C1) in the solid content of the antifouling coating composition for forming the antifouling coating film of the present invention are the same as the preferred ranges of the content thereof in the antifouling coating film.

The silicone oil (C1) used may be a commercially available product. Examples of the commercially available product include "KF-96-1,000 cs" (manufactured by Shin-Etsu Chemical Co., Ltd., kinetic viscosity (25° C.): 1,000 mm²/s) for the polydimethylsiloxane (unmodified), "KF-50-1,000 cs" (manufactured by Shin-Etsu Chemical Co., Ltd., phenyl modification rate: 5%, kinetic viscosity (25° C.): 1,000 mm²/s) for the phenyl-modified polydimethylsiloxane, and "X-22-4272 (manufactured by Shin-Etsu Chemical Co., Ltd., an ether-modified polydimethylsiloxane, in which a part of $R^{31}$ is an alkyl group having an ether group, kinetic viscosity (25° C.): 270 mm²/s), "KF-6020" (manufactured by Shin-Etsu Chemical Co., Ltd., an ether-modified polydimethylsiloxane, in which a part of $R^{32}$ is an alkyl group having an ether group, kinetic viscosity (25° C.): 180 mm²/s), "FZ-2203" (manufactured by Dow Corning Toray Co., Ltd., a polydimethylsiloxane, in which a part of $R^{33}$ is an alkylene group having an ether group), and "FZ-2160" (manufactured by Dow Corning Toray Co., Ltd., a polydimethylsiloxane, in which a part of $R^{33}$ is a propylene group having an ether group) for the ether-modified polydimethylsiloxane.

[Polymer (C2) containing Constituent Unit derived from Hydrophilic Group-Containing Unsaturated Monomer]

The polymer (C2) containing a constituent unit derived from a hydrophilic group-containing unsaturated monomer (which may be hereinafter referred to as a polymer (C2)) preferably contains the polymer (C2) that has a constituent unit derived from one or more kind of a hydrophilic group-containing unsaturated monomer selected from the group consisting of an unsaturated monomer (c21) represented by the following formula (I), tetrahydrofurfuryl (meth)acrylate (c22), 4-(meth)acryloylmorpholine (b23), and vinylpyrrolidone (c24).

Among these, in the case where the antifouling coating film of the present invention contains the polymer (C2), the polymer (C2) having a constituent unit derived from the unsaturated monomer (c21) represented by the following formula (I) is preferably contained from the standpoint of the enhancement of the antifouling property of the antifouling coating film, the standpoint of the convenience in the formation of the antifouling coating film, the releasability from a mold having a negative structure of the riblet structure, and the interlayer adhesiveness to the substrate layer, the intermediate layer, the pressure-sensitive adhesive layer, and the like, the standpoint of the prevention of contamination of a production apparatus of the coating film with the antifouling coating composition in coating, and the like.

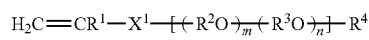
(I)

In the formula (I), $R^1$ represents a hydrogen atom or a monovalent hydrocarbon group having 1 to 10 carbon atoms; $R^2$ represents an ethylene group or a propylene group; $R^3$ represents a divalent hydrocarbon group having 4 to 10 carbon atoms; $R^4$ represents a hydrogen atom or a monovalent hydrocarbon group having 1 to 30 carbon atoms; m represents an integer of 1 to 50; n represents an integer of 0 to 50; and $X^1$ represents an ester bond, an amide bond, or a single bond.

$R^1$ represents a hydrogen atom or a monovalent hydrocarbon group having 1 to 10 carbon atoms. Examples of the monovalent hydrocarbon group include an alkyl group, such as a methyl group and an ethyl group; an alkenyl group, such as a vinyl group and a propenyl group; an aryl group, such as a phenyl group; and an aralkyl group, such as a benzyl group, and an alkyl group is preferred. The number of carbon atoms of the monovalent hydrocarbon group represented by $R^1$ is preferably from 1 to 6, more preferably from 1 to 4, further preferably 1 or 2, and particularly preferably 1 (i.e., the monovalent hydrocarbon group is particularly preferably a methyl group). $R^1$ preferably represents a hydrogen atom or an alkyl group, more preferably a hydrogen atom or a methyl group, and further preferably a hydrogen atom.

$R^2$ represents an ethylene group or a propylene group. In the case where m represents an integer of 2 or more, plural groups represented by $R^2$ may be the same as or different from each other. In the case where m represents an integer of 2 or more, $R^2$ preferably has at least one ethylene group. $R^2$ more preferably represents an ethylene group.

$R^3$ represents a divalent hydrocarbon group having 4 to 10 carbon atoms. Examples of the divalent hydrocarbon group include a linear or branched alkylene group, such as a butylene group; an alkenylene group; and an arylene group, such as a phenylene group, and among these, $R^3$ preferably represents a linear or branched alkylene group, more preferably a butylene group, and further preferably a n-butylene group. In the case where n represents an integer of 2 or more, plural groups represented by $R^3$ may be the same as or different from each other.

In the formula (I), $R^4$ represents a hydrogen atom or a monovalent hydrocarbon group having 1 to 30 carbon atoms. Examples of the monovalent hydrocarbon group include a linear, branched, or cyclic saturated or unsaturated aliphatic hydrocarbon group and an aromatic hydrocarbon group, more specific examples thereof include a methyl group, an ethyl group, a propyl group, a butyl group, a hexyl group, a cyclohexyl group, a phenyl group, an octyl group, a dodecyl group, an octadecyl group, and a nonylphenyl group, and $R^4$ preferably represents a hydrogen atom or an aliphatic hydrocarbon group, more preferably a hydrogen atom or a methyl group, and further preferably a methyl group.

In the case where $R^4$ represents these substituents, the polymer (C2) may exhibit favorable hydrophilicity, and an excellent antifouling property can be imparted to the formed antifouling coating film. In the case where $R^4$ represents a group containing a hetero atom other than a hydrogen atom and a carbon atom, the antifouling property may be lowered in some cases.

In the formula (I), m represents an integer of 1 to 50, and preferably an integer of 1 to 15.

In the formula (I), n represents an integer of 0 to 50, preferably an integer of 0 to 20, and more preferably 0.

In the description herein, the case where two or more different repeating units are described in parallel to each other in the brackets shows that the repeating units may be repeated in any form or order of a random form, an alternate form, and a block form. Specifically, for example, a formula —[X₃—Y₃]— (wherein X and Y each represent a repeating unit) may be any of a random form —XXYXYY—, an alternate form —XYXYXY—, and a block form —XXXYYY— or —YYYXXX—.

In the formula (I), $X^1$ represents an ester bond (—C(=O)O—), an amide bond (—C(=O)NH—), or a single bond, and preferably an ester bond (—C(=O)O—).

In the case where $X^1$ represents an ester bond or an amide bond, the carbonyl carbon is preferably bonded to the carbon atom bonded to $R^1$.

The unsaturated monomer (c21) represented by the formula (I) is preferably a compound represented by the following formula (II) from the standpoint of the availability, the economic efficiency, and the like.

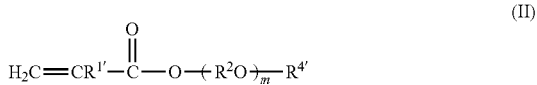

(II)

In the formula (II), $R^{1'}$ represents a hydrogen atom or a methyl group; $R^2$ represents an ethylene group or a propylene group; m represents an integer of 1 to 50; and $R^{4'}$ represents a hydrogen atom or a methyl group.

In the formula (II), $R^{1'}$ represents a hydrogen atom or a methyl group, and preferably a hydrogen atom.

$R^2$ represents an ethylene group or a propylene group. In the case where m represents an integer of 2 or more, plural groups represented by $R^2$ may be the same as or different from each other, and at least one of the groups represented by $R^2$ is preferably an ethylene group. $R^2$ more preferably represents an ethylene group.

m represents an integer of 1 to 50, preferably an integer of 1 to 15, more preferably an integer of 2 to 14, and further preferably an integer of 3 to 13.

$R^{4'}$ represents a hydrogen atom or a methyl group. In the case where m represents 1, $R^{4'}$ preferably represents a hydrogen atom or a methyl group, and in the case where m represents an integer of 2 or more, $R^{4'}$ preferably represents a methyl group.

The unsaturated monomer (c21) is preferably a compound represented by the following formula (III).

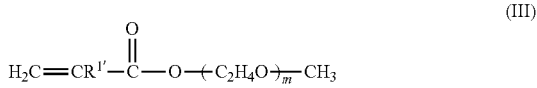

(III)

In the formula (III), $R^{1'}$ and m are the same as $R^{1'}$ and m in the formula (II).

Examples of the unsaturated monomer (c21) include 2-hydroxyethyl (meth)acrylate, 2-hydroxypropyl (meth)acrylate, 2-methoxyethyl (meth)acrylate, 2-methoxypropyl (meth)acrylate, polyethylene glycol mono(meth)acrylate, polypropylene glycol mono(meth)acrylate, poly(ethylene glycol-propylene glycol) mono(meth)acrylate, poly(ethylene glycol-butylene glycol) mono(meth)acrylate, methoxypolyethylene glycol mono(meth)acrylate, allyloxypoly(ethylene glycol-propylene glycol) mono(meth)acrylate, phenoxypolyethylene glycol-polypropylene glycol methacrylate, octoxypoly(ethylene glycol-propylene glycol) mono(meth)acrylate, dodecyloxypolyethylene glycol mono(meth)acrylate, octadecyloxypolyethylene glycol mono(meth)acrylate, nonylphenoxypolypropylene glycol acrylate, and ethylene glycol monoallyl ether. Among these, preferred examples thereof include 2-hydroxyethyl (meth)acrylate, 2-hydroxypropyl (meth)acrylate, 2-methoxyethyl (meth)acrylate, 2-methoxypropyl (meth)acrylate, and methoxypolyethylene glycol mono(meth)acrylate, more preferred examples thereof include 2-methoxyethyl (meth)acrylate, 2-methoxypropyl (meth)acrylate, and methoxypolyethylene glycol mono(meth)acrylate, and further preferred examples thereof include 2-methoxyethyl (meth)acrylate and methoxypolyethylene glycol mono(meth)acrylate.

In the description herein, the expression "(meth)acrylate" means "acrylate or methacrylate", and the other similar expressions also have the similar meanings.

The unsaturated monomer (c21) used may be a commercially available product, and examples thereof include NK Ester AM-90G (methoxypolyethylene glycol #400 acrylate), NK Ester AM-130G (methoxypolyethylene glycol #550 acrylate), NK Ester M-90G (methoxypolyethylene glycol #400 methacrylate), and NK Ester M-230G (methoxypolyethylene glycol #1000 methacrylate), all manufactured by Shin-Nakamura Chemical Co., Ltd.; Light Acrylate MTG-A (methoxy-triethylene glycol acrylate), Light Acrylate EC-A (ethoxy-diethylene glycol acrylate), Light Acrylate EHDG-AT (2-ethylhexyl-diethylene glycol acrylate), Light Ester HOA(N) (2-hydroxyethyl acrylate), Light Ester HO-250 (N) (2-hydroxyethyl methacrylate), Light Ester HOP(N) (2-hydroxypropyl methacrylate), and Light Ester 041MA (methoxypolyethylene glycol methacrylate), all manufactured by Kyoeisha Chemical Co., Ltd.; Blemmer ANP-300 (nonylphenoxypolypropylene glycol acrylate), Blemmer AP-400 (polypropylene glycol monoacrylate), Blemmer 70PEP-350B (polyethylene glycol polypropylene glycol monomethacrylate), Blemmer 55PET-800 (polyethylene glycol tetramethylene glycol monomethacrylate), and Blemmer 50POEP-800B (octoxypolyethylene glycol polypropylene glycol methacrylate), all manufactured by NOF Corporation; SR504 (ethoxylated nonylphenyl acrylate), manufactured by Arkema, Inc.; and Viscoat #MTG (methoxypolyethylene glycol acrylate), manufactured by Osaka Organic Chemical Industry, Ltd.

As the tetrahydrofurfuryl (meth)acrylate (c22), any compound that has a tetrahydrofurfuryl (meth)acrylate structure can be used with no particular limitation. Specifically, the tetrahydrofurfuryl (meth)acrylate (c22) may be a compound having one or more arbitrary substituents on the oxolane ring of tetrahydrofurfuryl (meth)acrylate. Examples of the substituent include an alkyl group having 1 to 6 carbon atoms, a halogenated alkyl group having 1 to 6 carbon atoms, an aryl group having 6 to 14 carbon atoms, an acyl group having 1 to 7 carbon atoms, a halogen atom, and a hydroxy group.

The tetrahydrofurfuryl (meth)acrylate (c22) is preferably tetrahydrofurfuryl acrylate or tetrahydrofurfuryl methacrylate, and more preferably tetrahydrofurfuryl acrylate.

As the 4-(meth)acryloylmorpholine (c23), any compound that has a 4-(meth)acryloylmorpholine structure can be used with no particular limitation. Specifically, the 4-(meth)acryloylmorpholine (c23) may be a compound having one or more arbitrary substituents on the morpholine ring of 4-(meth)acryloylmorpholine. Examples of the substituent include an alkyl group having 1 to 6 carbon atoms, a halogenated alkyl group having 1 to 6 carbon atoms, an aryl group having 6 to 14 carbon atoms, an acyl group having 1 to 7 carbon atoms, a halogen atom, and a hydroxy group.

The 4-(meth)acryloylmorpholine (c23) is preferably 4-acryloylmorpholine or 4-methacryloylmorpholine, and more preferably 4-acryloylmorpholine.

As the vinylpyrrolidone (c24), any compound that has a vinylpyrrolidone structure can be used with no particular limitation. Specifically, the vinylpyrrolidone (c24) may be a compound having one or more arbitrary substituents on the pyrrolidine ring. Examples of the substituent include an alkyl group having 1 to 6 carbon atoms, a halogenated alkyl group having 1 to 6 carbon atoms, an aryl group having 6 to 14 carbon atoms, an acyl group having 1 to 7 carbon atoms, a halogen atom, and a hydroxy group.

Examples of the vinylpyrrolidone (c24) include 1-vinyl-2-pyrrolidone, and also include 3-acetyl-1-vinylpyrrolidin-2-one and 3-benzoyl-1-vinylpyrrolidin-2-one. Among these, the vinylpyrrolidone (b24) is preferably 1-vinyl-2-pyrrolidone (which may also be referred to as N-vinyl-2-pyrrolidone).

In the polymer (C2), the content of the constituent unit derived from at least one selected from the group consisting of the unsaturated monomer (c21) represented by the formula (I), the tetrahydrofurfuryl (meth)acrylate (c22), the 4-(meth)acryloylmorpholine (c23), and the vinylpyrrolidone (c24) is preferably from 1 to 100% by mass, more preferably from 3 to 80% by mass, further preferably from 5 to 70% by mass, and still further preferably from 10 to 50% by mass.

The content (mass) of the constituent unit derived from at least one selected from the group consisting of the unsaturated monomer (c21), the tetrahydrofurfuryl (meth)acrylate (c22), the 4-(meth)acryloylmorpholine (c23), and the vinylpyrrolidone (c24) in the polymer (C2) can be assumed to be the same as the charged amount (mass) of the monomers (c21) to (c24) used for the polymerization reaction.

In the present invention, the polymer (C2) may be a homopolymer containing a constituent unit derived from one kind of the unsaturated monomer selected from the group consisting of the unsaturated monomer (c21), the tetrahydrofurfuryl (meth)acrylate (c22), the 4-(meth)acryloylmorpholine (c23), or the vinylpyrrolidone (c24), or a copolymer containing constituent units derived from two or more kinds of the unsaturated monomers selected from the group consisting of the unsaturated monomer (c21), the tetrahydrofurfuryl (meth)acrylate (c22), the 4-(meth)acryloylmorpholine (c23), and the vinylpyrrolidone (c24).

In the present invention, the polymer (C2) is preferably a copolymer containing a constituent unit derived from at least one kind of the unsaturated monomer selected from the group consisting of the unsaturated monomer (c21), the tetrahydrofurfuryl (meth)acrylate (c22), the 4-(meth)acryloylmorpholine (b23), and the vinylpyrrolidone (c24), and depending on necessity, a constituent unit derived from at least one of an additional unsaturated monomer (c25).

The additional unsaturated monomer (c25) preferably contains an unsaturated monomer (c25-1) represented by the following formula (IV).

$$H_2C=CR^{41}-X^2-R^{42} \qquad (IV)$$

In the formula (IV), $R^{41}$ represents a hydrogen atom or a monovalent hydrocarbon group having 1 to 10 carbon atoms; $R^{42}$ represents a hydrogen atom or a monovalent hydrocarbon group having 1 to 50 carbon atoms; and $X^2$ represents an ester bond, an amide bond, or a single bond.

In the formula (IV), $R^{41}$ represents a hydrogen atom or a monovalent hydrocarbon group having 1 to 10 carbon atoms. Examples of the monovalent hydrocarbon group include the groups exemplified above for $R^1$ in the formula (I), and $R^{41}$ preferably represents a hydrogen atom or an alkyl group, more preferably a hydrogen atom or a methyl group, and further preferably a hydrogen atom.

In the formula (IV), $R^{42}$ represents a hydrogen atom or a monovalent hydrocarbon group having 1 to 50, preferably 1 to 30, carbon atoms. Examples of the monovalent hydrocarbon group include a linear or branched hydrocarbon group, such as a methyl group, an ethyl group, a n-propyl group, an isopropyl group, a n-butyl group, an isobutyl group, a tert-butyl group, a sec-butyl group, a n-pentyl group, a n-hexyl group, a n-octyl group, an isooctyl group, a 2-ethylhexyl group, a dodecyl group, and an octadecyl group; and a cyclic hydrocarbon group, such as a cyclohexyl group, a phenyl group, or a benzyl group, and a n-butyl group, an isobutyl group, and a 2-ethylhexyl group are preferred.

In the formula (IV), $X^2$ represents an ester bond (—C(=O)O—), an amide bond (—C(=O)NH—), or a single bond, and an ester bond is preferred among these.

In the case where $X^2$ represents an ester bond or an amide bond, the carbonyl carbon is preferably bonded to the carbon atom bonded to $R^{41}$.

Examples of the unsaturated monomer (c25-1) include methyl (meth)acrylate, ethyl (meth)acrylate, propyl (meth)acrylate, isopropyl (meth)acrylate, n-butyl (meth)acrylate, isobutyl (meth)acrylate, tert-butyl (meth)acrylate, n-pentyl (meth)acrylate, hexyl (meth)acrylate, cyclohexyl (meth)acrylate, n-octyl (meth)acrylate, isooctyl (meth)acrylate, 2-ethylhexyl (meth)acrylate, 3,5,5-trimethylhexyl (meth)acrylate, lauryl (meth)acrylate, cetyl (meth)acrylate, stearyl (meth)acrylate, isostearyl (meth)acrylate, phenyl (meth)acrylate, and benzyl (meth)acrylate, and among these, n-butyl (meth)acrylate, isobutyl (meth)acrylate, and 2-ethylhexyl (meth)acrylate are preferred.

The additional unsaturated monomer (c25) also preferably contains an organopolysiloxane group-containing unsaturated monomer (c25-2).

The organopolysiloxane group-containing unsaturated monomer (c25-2) used may be a commercially available product, and examples thereof include Silaplane™-0701T (tris(trimethylsiloxy)silylpropyl methacrylate), Silaplane FM-0711 (methacrylic group-containing dimethylpolysiloxane, number average molecular weight: 1,000), and Silaplane FM-0721 (methacrylic group-containing dimethylpolysiloxane, number average molecular weight: 5,000), all manufactured by JNC Corporation.

In the case where the additional unsaturated monomer (c25) contains the organopolysiloxane group-containing unsaturated monomer (c25-2), the antifouling property of the formed antifouling coating film can be enhanced, but since the adhesiveness of the coating film to the underlying material may be lowered in some cases, it is necessary to prepare appropriately depending on the kind of the underlying material, on which the antifouling coating film is provided.

In the case where the polymer (C2) contains a constituent unit derived from the other monomer (c25), the content of the constituent unit in the polymer (C2) is preferably 99% by mass or less, more preferably 97% by mass or less, further preferably 95% by mass or less, and still further preferably 90% by mass or less, and is preferably 20% by mass or more, more preferably 30% by mass or more, and further preferably 50% by mass or more.

In the present invention, the weight average molecular weight (Mw) of the polymer (C2) is preferably 1,000 or more, more preferably 3,000 or more, further preferably 5,000 or more, and particularly preferably 7,000 or more, and is preferably 150,000 or less, more preferably 100,000 or less, further preferably 50,000 or less, and particularly preferably 30,000 or less from the standpoint of the antifouling property of the formed antifouling coating film and the viscosity of the antifouling coating composition.

The weight average molecular weight (Mw) of the polymer (C2) that is in the range is preferred since the formed coating film can be imparted with good antifouling property and the convenience in the formation of the antifouling coating film can be achieved.

In the case where the antifouling coating composition according to the present invention contains the polymer (C2), the content of the polymer (C2) in the antifouling coating composition according to the present invention is preferably 0.1% by mass or more, more preferably 0.5% by mass or more, and further preferably 2% by mass or more, and is preferably 50% by mass or less, more preferably 25% by mass or less, and further preferably 10% by mass or less, from the standpoint of the enhancement of the antifouling property of the antifouling coating film formed with the coating composition, the standpoint of the workability in the formation of the coating film, the convenience in the formation of the coating film, the releasability from a mold having a negative structure of the riblet structure, and the interlayer adhesiveness to the substrate layer, the intermediate layer, the pressure-sensitive adhesive layer, and the like, the standpoint of the retention of the strength of the coating film, and the like.

In the case where the antifouling coating film of the present invention contains the polymer (C2), the content of the polymer (C2) in the antifouling coating film of the present invention is preferably 0.2% by mass or more, more preferably 1% by mass or more, and further preferably 4% by mass or more, and is preferably 80% by mass or less, more preferably 50% by mass or less, and further preferably 20% by mass or less, from the same standpoints as above.

The preferred ranges of the content of the polymer (C2) in the solid content of the antifouling coating composition for forming the antifouling coating film of the present invention are the same as the preferred ranges of the content thereof in the antifouling coating film.

In the present invention, the polymer (C2) may be used alone or as a combination of two or more kinds thereof.

[Inorganic Filler (D)]

The antifouling coating film of the present invention and the antifouling coating composition for forming the antifouling coating film may contain an inorganic filler (D) for the purpose of enhancing the fLowability and the thixotropy of the coating composition.

In the case where the antifouling coating film of the present invention and the antifouling coating composition according to the present invention contain an inorganic filler (D), the flowability and the thixotropy of the antifouling coating composition may be improved, and a coating film having a sufficient thickness can be formed in a small number of coating operations even on a vertical coating surface or the like. Furthermore, the antifouling coating film of the present invention may be improved in properties thereof including hardness, tensile strength, and elongation, in a well balanced manner.

Examples of the inorganic filler (D) include silica, mica, calcium carbonate, aluminum carbonate, magnesium carbonate, barium carbonate, aluminum oxide, aluminum hydroxide, aluminum silicate, magnesium silicate, potassium feldspar, zinc oxide, kaolin, alumina white, barium sulfate, calcium sulfate, zinc sulfate, and glass short fibers. The inorganic filler may be used alone or as a combination of two or more kinds thereof.

Among these, the inorganic filler (D) preferably contains silica from the standpoint of the enhancement of the properties of the antifouling coating film of the present invention including the hardness, the tensile strength, and the elongation, in a well balanced manner.

The silica used may be hydrophilic silica (surface-non-treated silica), such as wet method silica (hydrated silica) and dry method silica (fumed silica and anhydrous silica). The silica used may also be hydrophobic silica obtained by subjecting the surface of the aforementioned silica to a hydrophobic treatment, such as hydrophobic wet method silica and hydrophobic fumed silica. The silica may be used alone or as a combination of two or more kinds thereof.

The wet method silica is not particularly limited, and for example, wet method silica having an adsorbed water content of 4 to 8% by mass, a bulk density of 200 to 300 g/L, a primary particle diameter of 10 to 30 µm, and a specific surface area (BET surface area) of 10 m²/g or more is preferred.

The dry method silica is not particularly limited, and for example, dry method silica having a water content of 1.5% by mass or less, a bulk density of 50 to 100 g/L, a primary particle diameter of 8 to 20 µm, and a specific surface area of 10 m²/g or more is preferred.

The hydrophobic fumed silica includes ones obtained by subjecting dry method silica to a surface treatment with at least one kind of an organosilicon compound selected from methyltrichlorosilane, dimethyldichlorosilane, hexamethyldisilazane, hexamethylcyclotrisiloxane, octamethylcyclotetrasiloxane, and the like. The hydrophobic fumed silica undergoes less water adsorption with the lapse of time, and the water content thereof is preferably 0.3% by mass or less, and more preferably from 0.1 to 0.2% by mass.

The hydrophobic fumed silica is not particularly limited, and for example, hydrophobic fumed silica having a primary particle diameter of 5 to 50 nm, a bulk density of 50 to 100 g/L, and a specific surface area of 10 m²/g or more is preferred. In the case where the hydrophobic fumed silica is subjected to the heat treatment described later, the content of water adsorbed on the surface of the hydrophobic fumed silica after the heat treatment may be decreased in some cases. In this case, the water content of the hydrophobic fumed silica is preferably 0.2% by mass or less, more preferably 0.1% by mass or less, and further preferably from 0.05 to 0.1% by mass.

The silica used may be a commercially available product. Examples of the commercially available product include "Aerosil R974", "Aerosil RX200", and "Aerosil 200", all manufactured by Nippon Aerosil Co., Ltd. The silica used may be the material described in JP 2001-139816 A.

In the case where the curable organopolysiloxane is mixed as the binder forming component (a) contained in the coating composition according to the present invention, the silica may be a heat-treated material obtained by performing a heat treatment together with the curable organopolysiloxane in advance. By performing a heat treatment of silica and a part or the whole of the curable organopolysiloxane, the affinity of these components may be enhanced to provide such effects as the suppression of aggregation of the silica.

Examples of the method for performing the heat treatment of the silica and the curable organopolysiloxane include a method of performing a heat treatment under atmospheric pressure or reduced pressure, at a temperature of preferably 100° C. or more and the decomposition temperature of the mixed component or less, more preferably from 100 to 300° C., and further preferably from 140 to 200° C., for a period of preferably from 3 to 30 hours.

The silica may be mixed in the coating composition in the form of a kneaded product obtained by kneading with the curable organopolysiloxane. The use of the kneaded product obtained by kneading the silica with the curable organopolysiloxane may suppress the excessive increase of the viscosity of the coating composition.

Examples of the method for producing the kneaded product of the silica and the curable organopolysiloxane include the method described in JP 2004-182908 A.

In the case where the antifouling coating composition according to the present invention contains the inorganic filler (D) and the curable organopolysiloxane, the content of the inorganic filler (D) per 100 parts by mass of the curable organopolysiloxane is preferably 0.5 part by mass or more, more preferably 1 part by mass or more, further preferably 2 parts by mass or more, still further preferably 3 parts by mass or more, still more further preferably 4 parts by mass or more, still more further preferably 5 parts by mass or more, still more further preferably 6 parts by mass or more, and still more further preferably 7 parts by mass or more, from the standpoint of the enhancement of the thixotropy of the coating composition, and the standpoint of the enhancement of the strength and the hardness of the coating film, and is preferably 100 parts by mass or less, more preferably 50 parts by mass or less, and further preferably 20 parts by mass or less, from the standpoint of the suppression of the excessive increase of the viscosity of the coating composition.

In the case where the antifouling coating film of the present invention contains the inorganic filler (D), the content of the inorganic filler (D) in the antifouling coating film is preferably 0.1% by mass or more, and more preferably 1% by mass or more, and is preferably 20% by mass or less, and more preferably 10% by mass or less, from the standpoint of the enhancement of the strength and the hardness of the coating film.

The preferred ranges of the content of the inorganic filler (D) in the solid content of the antifouling coating composition for forming the antifouling coating film of the present invention are the same as the preferred ranges of the content thereof in the antifouling coating film.

[Silane Coupling Agent (E)]

The antifouling coating film of the present invention and the antifouling coating composition for forming the antifouling coating film may contain a silane coupling agent (E) except for the organosilicon crosslinking agent (F) described later for the purpose of enhancing the releasability from a mold having a negative structure of the riblet structure and the interlayer adhesiveness to the substrate layer, the intermediate layer, the pressure-sensitive adhesive layer, and the like.

The silane coupling agent (E) used is preferably a compound represented by the following formula (E1).

$$(R^{21}O)_w R^{22}{}_{(3-w)}Si—R^{23}—Z \quad (E1)$$

In the formula (E1), $R^{21}$ and $R^{22}$ each independently represent a monovalent hydrocarbon group having 1 to 10 carbon atoms; $R^{23}$ represents a divalent hydrocarbon group having 1 to 20 carbon atoms, which may have a heteroatom intervening therein; Z represents a polar group; and w represents an integer of 2 or 3.

In the formula (E1), $R^{21}$ and $R^{22}$ each independently represent a monovalent hydrocarbon group having 1 to 10 carbon atoms. Examples of the monovalent hydrocarbon group having 1 to 10 carbon atoms represented by $R^{21}$ include an alkyl group having 1 to 10 carbon atoms. Examples of the monovalent hydrocarbon group having 1 to 10 carbon atoms represented by $R^{22}$ include an alkyl group having 1 to 10 carbon atoms, an alkenyl group having 2 to 10 carbon atoms, and an aryl group having 6 to 10 carbon atoms.

Examples of the alkyl group having 1 to 10 carbon atoms represented by $R^{21}$ and $R^{22}$, and the alkenyl group having 2 to 10 carbon atoms and the aryl group having 6 to 10 carbon atoms represented by $R^{22}$ include the groups exemplified for $R^{11}$ and $R^{13}$ in the formula (A1) that have the corresponding number of carbon atoms.

In the formula (E1), $R^{21}$ is preferably an alkyl group having 1 to 10 carbon atoms, more preferably a methyl group, an ethyl group, a propyl group, or a butyl group, and further preferably a methyl group.

The plural groups represented by $R^{21}$ may be the same as or different from each other.

In the formula (E1), $R^{22}$ is preferably an alkyl group having 1 to 10 carbon atoms, an alkenyl group having 2 to 10 carbon atoms, or an aryl group having 6 to 10 carbon atoms, more preferably a methyl group, an ethyl group, a propyl group, a butyl group, or a phenyl group, further preferably a methyl group, an ethyl group, a propyl group, or a butyl group, and still further preferably a methyl group.

In the formula (E1), $R^{23}$ represents a divalent hydrocarbon group having 1 to 20 carbon atoms, which may have a heteroatom intervening therein. Examples of the divalent hydrocarbon group having 1 to 20 carbon atoms represented by $R^{23}$ include the groups exemplified for $R^{33}$ in the formula (C1) that have the corresponding number of carbon atoms. Among these, an alkylene group having 4 to 11 carbon atoms is preferred.

Examples of the group having a hetero atom similarly include the groups exemplified for $R^{33}$ in the formula (C1). Among these, an —$NR^a$— group is preferred, and an —NH— group is more preferred. One kind or two or more kinds of the group having a hetero atom represented by $R^{23}$ may be contained, and in the case where there are plural groups each having a hetero atom, the groups may be the same as or different from each other.

In the formula (E1), Z represents a polar group. The polar group is preferably an amino group, an iminoalkyl group (—$CR^c$=NH, wherein $R^c$ represents a hydrogen atom or a monovalent hydrocarbon group having 1 to 10 carbon atoms), a glycidoxy group, an isocyanate group, a thiol group, a hydrosilyl group, or a (meth)acryloyloxy group, and more preferably an amino group. The amino group represented by Z in the formula (E1) may be any of a primary amino group, a secondary amino group, and a tertiary amino group, and among these, a primary amino group is preferred.

In the formula (E1), w represents an integer of 2 or 3, and preferably 3.

Examples of the silane coupling agent (E) include 3-(2-aminoethylamino)propyltrimethoxysilane, 3-aminopropyltrimethoxysilane, 3-aminopropyltriethoxysilane, 3-(2-(2-aminoethylamino)ethylamino)propyltrimethoxysilane, 3-glycidoxypropyltrimethoxysilane, 3-isocyanatopropyltrimethoxysilane, 3-mercaptopropyltrimethoxysilane, and N-phenyl-3-aminopropyltrimethoxysilane.

The silane coupling agent (E) used may be a partially condensed product of the compound represented by the formula (E1). The silane coupling agent (E) may be used alone or as a combination of two or more kinds thereof.

In the case where the antifouling coating film of the present invention contains the silane coupling agent (E), the content of the silane coupling agent (E) in the antifouling coating film is preferably 0.01% by mass or more, and more preferably 0.05% by mass or more, and is preferably 10% by mass or less, and more preferably 2% by mass or less, from the standpoint of the enhancement of the releasability from a mold having a negative structure of the riblet structure and the interlayer adhesiveness to the substrate layer, the intermediate layer, the pressure-sensitive adhesive layer, and the like.

The preferred ranges of the content of the silane coupling agent (E) in the solid content of the antifouling coating composition for forming the antifouling coating film of the present invention are the same as the preferred ranges of the content thereof in the antifouling coating film.

[Organosilicon Crosslinking Agent (F)]

The antifouling coating film of the present invention and the antifouling coating composition for forming the antifouling coating film may contain an organosilicon crosslinking agent (F) for the purpose of enhancing the curability and the strength of the antifouling coating film.

The organosilicon crosslinking agent (F) is preferably a compound represented by the following formula (F1) and/or a partial condensate thereof from the standpoint of the storage stability of the coating composition, the resistance against skinning on the surface (liquid surface) of the coating composition due to moisture, and the enhancement of the production stability in coating.

$$R^{51}{}_{d}SiY_{(4-d)} \quad (F1)$$

In the formula (F1), $R^{51}$ represents a hydrocarbon group having 1 to 6 carbon atoms; Y each independently represent a hydrolyzable group; and d represents an integer of 0 to 2.

In the formula (F1), $R^{51}$ represents a monovalent hydrocarbon group having 1 to 6 carbon atoms, and examples thereof include a linear or branched alkyl group, such as a methyl group, an ethyl group, and a propyl group, a cyclic alkyl group, such as a cyclohexyl group, an alkenyl group, such as a vinyl group, and an aryl group, such as a phenyl group. Among these, a methyl group and an ethyl group are preferred.

In the case where d represents 2, the plural groups represented by $R^{51}$ may be the same as or different from each other.

In the formula (F1), Y each independently represent a hydrolyzable group, and examples of the hydrolyzable group include the hydrolyzable groups exemplified for the formula (A1). Among these, an alkoxy group and an oxime group are preferred. The alkoxy group is preferably a methoxy group or an ethoxy group. The plural groups represented by Y may be the same as or different from each other.

In the formula (F1), d represents an integer of 0 to 2, and preferably represents 0 from the standpoint of the enhancement of the curability and the coating film strength of the antifouling coating film.

The organosilicon crosslinking agent (F) used may be a commercially available product. As the commercially available product, examples of the tetraethyl orthosilicate include "Ethyl Silicate 28", manufactured by Colcoat Co., Ltd., and "Ethyl Orthosilicate", manufactured by Tama Chemicals Co., Ltd. Examples of the partial condensate of the tetraethyl orthosilicate include "Silicate 40", manufactured by Tama Chemicals Co., Ltd., and "Wacker Silicate TES 40 WN", manufactured by Asahi Kasei Wacker Silicone Co., Ltd. Examples of the alkyltrialkoxysilane include "KBM-13", manufactured by Shin-Etsu Chemical Co., Ltd. Examples of the oxime silane include "MTO(MOS)" (methyltris(methyl ethyl ketoxime) silane) and "VTO(VOS)" (vinyltris(methyl ethyl ketoxime)silane), manufactured by Toray Industries, Inc.

The organosilicon crosslinking agent (F) may be used alone or as a combination of two or more kinds thereof.

In the case where the antifouling coating film of the present invention contains the organosilicon crosslinking agent (F), the content of the organosilicon crosslinking agent (F) in the antifouling coating film is preferably from 0.2 to 20% by mass, and more preferably from 0.4 to 10% by mass, from the standpoint of the control of the curing rate of the formed coating film, and the standpoint of the enhancement of the strength of the coating film.

The preferred ranges of the content of the organosilicon crosslinking agent (F) in the solid content of the antifouling coating composition for forming the antifouling coating film of the present invention are the same as the preferred ranges of the content thereof in the antifouling coating film.

[Curing Catalyst (G)]

The antifouling coating film of the present invention and the antifouling coating composition for forming the antifouling coating film may contain a curing catalyst (G) for the purpose of enhancing the curing rate of the formed coating film and enhancing the strength of the coating film.

Examples of the curing catalyst (G) include the curing catalyst described in JP 4-106156 A.

Specific examples thereof include:
- a tin carboxylate compound, such as tin naphthenate and tin oleate;
- a tin compound, such as dibutyltin diacetate, dibutyltin acetoacetonate, dibutyltin dilaurate, dibutyltin dioleate, dibutyltin oxide, dibutyltin dimethoxide, dibutyltin dipentanoate, dibutyltin dioctoate, dibutyltin dineodecanoate, dioctyltin dineodecanoate, bis(dibutyltin laurate) oxide, dibutylbis(triethoxysiloxy) tin, bis(dibutyltin acetate) oxide, dibutyltin bis(ethyl maleate), and dioctyltin bis(ethyl maleate);
- a titanate ester compound and a titanium chelate compound, such as tetraisopropoxy titanium, tetra-N-butoxy titanium, tetrakis(2-ethylhexyloxy) titanium, dipropoxy bis(acetylacetonato) titanium, and titanium isopropoxy octyl glycol;
- an organic metal compound, such as zinc naphthenate, zinc stearate, zinc 2-ethyloctoate, iron 2-ethylhexanoate, cobalt 2-ethylhexanoate, manganese 2-ethylhexanoate, cobalt naphthenate, and an alkoxy aluminum compound; and
- a lower fatty acid salt of an alkali metal, such as potassium acetate, sodium acetate, and lithium oxalate.

The curing catalyst (G) used may be a commercially available product. Examples thereof include "Neostann U-100", manufactured by Nitto Kasei Co., Ltd. and "Gleck TL", manufactured by DIC Corporation.

The curing catalyst (G) may be used alone or as a combination of two or more kinds thereof.

In the case where the antifouling coating composition according to the present invention contains the curing catalyst (G), the content of the curing catalyst (G) in the solid content of the coating composition is preferably 0.001 to 10% by mass, and more preferably 0.01 to 1% by mass, from the standpoint of the enhancement of the curing rate of the formed coating film, and the standpoint of the good balance with respect to the pot life after preparing the coating composition.

The preferred ranges of the content of the curing catalyst (G) in the antifouling coating film of the present invention are the same as the preferred ranges of the content thereof in the solid content of the coating composition.

[Dehydrating Agent (H)]

The antifouling coating film of the present invention and the antifouling coating composition for forming the antifouling coating film may contain a dehydrating agent (H) for the purpose of enhancing the storage stability of the coating composition.

Examples of the dehydrating agent (H) used include zeolite, which has been known as a generic name "molecular sieve", porous alumina, an ortho ester, such as an alkyl orthoformate, orthoboric acid, and an isocyanate.

The dehydrating agent (H) may be used alone or as a combination of two or more kinds thereof.

In the case where the antifouling coating composition according to the present invention contains the dehydrating agent (H), the content of the dehydrating agent (H) in the solid content of the coating composition is preferably 0.1 to 10% by mass, and more preferably 0.5 to 5% by mass, from the standpoint of the enhancement of the storage stability of the coating composition, and the standpoint of the enhancement of the resistance against skinning on the surface (liquid surface) of the coating composition due to moisture and the production stability in coating.

The preferred ranges of the content of the dehydrating agent (H) in the antifouling coating film of the present invention are the same as the preferred ranges of the content thereof in the solid content of the antifouling coating composition.

[Coloring Pigment (I)]

The antifouling coating film of the present invention and the antifouling coating composition for forming the antifouling coating film may contain a coloring pigment (I) except for the inorganic filler (D) for the purpose of enhancing the design property and the visibility of the antifouling coating film and the coating composition.

Examples of the coloring pigment (I) include an inorganic coloring pigment, such as carbon black, red ocher (red iron oxide), titanium white (titanium oxide), yellow iron oxide, and black iron oxide, and an organic coloring pigment, such as naphthol red and phthalocyanine blue. The coloring pigment may further contain various colorants, such as a dye.

The coloring pigment (I) may be used alone or as a combination of two or more kinds thereof.

In the case where the antifouling coating film of the present invention contains the coloring pigment (I), the content of the coloring pigment (I) in the antifouling coating film is preferably 0.5 to 20% by mass.

The preferred ranges of the content of the coloring pigment (I) in the solid content of the antifouling coating composition for forming the antifouling coating film of the present invention are the same as the preferred ranges of the content thereof in the antifouling coating film.

[Organic Solvent (J)]

The antifouling coating composition according to the present invention may contain an organic solvent (J) for the purpose of the enhancement of the coating workability by retaining the low viscosity of the coating composition and enhancing the spraying atomization property of the coating composition.

Examples of the organic solvent (J) include an aromatic hydrocarbon organic solvent, an aliphatic hydrocarbon organic solvent, an alicyclic hydrocarbon organic solvent, a ketone organic solvent, and an ester organic solvent, and among these, an aromatic hydrocarbon organic solvent and a ketone organic solvent are preferred.

Examples of the aromatic hydrocarbon organic solvent include toluene, xylene, and mesitylene.

Examples of the aliphatic hydrocarbon organic solvent include pentane, hexane, heptane, and octane.

Examples of the alicyclic hydrocarbon organic solvent include cyclohexane, methylcyclohexane, and ethylcyclohexane.

Examples of the ketone organic solvent include acetylacetone, acetone, methyl ethyl ketone, methyl isobutyl ketone, and dimethyl carbonate.

Examples of the ester organic solvent include propylene glycol monomethyl ether acetate.

The organic solvent (J) may be used alone or as a combination of two or more kinds thereof.

In the case where the antifouling coating composition according to the present invention contains the organic solvent (J), the content of the organic solvent (J) in the coating composition may be appropriately controlled corresponding to the viscosity of the coating composition, is preferably 1% by mass or more, more preferably 10% by mass or more, further preferably 20% by mass or more, and still further preferably 25% by mass or more, and from the standpoint of the prevention of the sagging in coating, is preferably 70% by mass or less, and more preferably 40% by mass or less.

[Anti-Sagging and Anti-Settling Agent (K)]

The antifouling coating film of the present invention and the antifouling coating composition for forming the antifouling coating film may contain an anti-sagging and anti-settling agent (K).

Examples of the anti-sagging and anti-settling agent (K) include organoclay wax (such as a stearate salt, a lecithin salt, and an alkyl sulfonate and the like of Al, Ca, and Zn), organic wax (such as polyethylene wax, oxidized polyethylene wax, amide wax, polyamide wax, and hydrogenated castor oil wax), and a mixture of organoclay wax and organic wax.

The anti-sagging and anti-settling agent (K) used may be a commercially available product. Examples of the commercially available product include "Disparlon 305", "Disparlon 4200-20", and "Disparlon A630-20X", all manufactured by Kusumoto Chemicals, Ltd.

The anti-sagging and anti-settling agent (K) may be used alone or as a combination of two or more kinds thereof.

In the case where the antifouling coating composition according to the present invention contains the anti-sagging and anti-settling agent (K), the content of the anti-sagging and anti-settling agent (K) in the solid content of the coating composition is preferably 0.01 to 10% by mass, and more preferably 0.1 to 3% by mass.

The preferred ranges of the content of the anti-sagging and anti-settling agent (K) in the antifouling coating film of the present invention are the same as the preferred ranges of the content thereof in the solid content of the antifouling coating composition.

[Enzyme (L)]

The antifouling coating film of the present invention and the antifouling coating composition for forming the antifouling coating film may contain an enzyme (L) for the purpose of enhancing the antifouling property of the formed antifouling coating film.

Examples of the enzyme (L) include serine protease, cysteine protease, metalloproteinase, cellulase, hemicellulase, pectinase, and glycosidase.

The enzyme (L) may be used alone or as a combination of two or more kinds thereof.

In the case where the antifouling coating film of the present invention contains the enzyme (L), the content of the enzyme in the antifouling coating film is preferably 0.0005 to 5% by mass, and more preferably 0.01 to 0.1% by mass.

The preferred ranges of the content of the enzyme (L) in the solid content of the antifouling coating composition for forming the antifouling coating film of the present invention are the same as the preferred ranges of the content thereof in the antifouling coating film.

[Flame Retardant (M)]

The antifouling coating film of the present invention and the antifouling coating composition for forming the antifouling coating film may contain a flame retardant (M). Examples of the flame retardant (M) include antimony oxide and oxidized paraffin.

The flame retardant (M) may be used alone or as a combination of two or more kinds thereof.

In the case where the antifouling coating film of the present invention contains the flame retardant (M), the content of the flame retardant in the antifouling coating film is preferably 0.01 to 20% by mass, and more preferably 0.1 to 1% by mass.

The preferred ranges of the content of the flame retardant (M) in the solid content of the antifouling coating composition for forming the antifouling coating film of the present invention are the same as the preferred ranges of the content thereof in the antifouling coating film.

[Thermal Conductivity Improver (N)]

The antifouling coating film of the present invention and the antifouling coating composition for forming the antifouling coating film may contain a thermal conductivity improver (N). Examples of the thermal conductivity improver (N) include boron nitride and aluminum oxide.

The thermal conductivity improver (N) may be used alone or as a combination of two or more kinds thereof.

In the case where the antifouling coating film of the present invention contains the thermal conductivity improver (N), the content of the thermal conductivity improver in the antifouling coating film is preferably from 0.01 to 20% by mass, and more preferably 0.1 to 1% by mass.

The preferred ranges of the content of the thermal conductivity improver (N) in the solid content of the antifouling coating composition for forming the antifouling coating film of the present invention are the same as the preferred ranges of the content thereof in the antifouling coating film.

<Kit of Coating Composition>

The antifouling coating composition according to the present invention may be formed as a one-pack type coating material composed of a single component, or may also be formed as a multi-pack type coating material composed of two or more components.

In the case of a multi-pack type coating material, it is preferred that the respective components (respective liquids) each contain one or plural components, are individually packed, and then stored and kept in a state of being charged in a container, such as a can, etc., and by mixing the contents of the respective components at the time of coating, the coating composition can be prepared.

[Method of manufacturing Antifouling Coating Film]

The antifouling coating film of the present invention is preferably formed with the antifouling coating composition described above. For example, the antifouling coating film can be formed in such a manner that the antifouling coating composition according to the present invention is coated on a substrate or the like to form a coated article, and then the coated article is cured and/or dried.

It suffices that the method of manufacturing the antifouling coating film having a riblet structure includes a step of forming the riblet structure on the surface thereof, at least any of during the step of forming the antifouling coating film and after the step.

The method of coating the antifouling coating composition used for forming the antifouling coating film may be a known method, and examples thereof include a method using a spray, a brush, a roller, a film applicator, a flow coater, a roll coater, or the like, and a method of impregnating an article to be coated with the antifouling coating composition.

Examples of the method for forming the riblet structure on the surface of the antifouling coating film include (1-1) a method of transferring a surface shape of a mold having the riblet structure to the surface of the antifouling coating film, (1-2) a method of forming the antifouling coating film on a substrate or a coating film having the riblet structure, (1-3) a method of cutting the surface of the coating film with laser or a blade, and a method combining the methods (1-1) to (1-3).

Among these, the method (1-1) and the method (1-2) are preferred from the standpoint of the convenience in the formation of the riblet structure, and the method (1-1) is preferred from the standpoint that the target riblet structure can be precisely provided.

The method (1-1) is a method of transferring a surface shape of a mold to the surface of the antifouling coating film, by using a mold having a structure obtained by inverting the concavity and convexity of the target riblet structure, i.e., a surface shape of a negative structure of the riblet structure.

Examples of the method (1-1) include a method including any one of a step of coating the antifouling coating composition on a substrate or a release surface, and then pressing the mold onto the surface of the antifouling coating film during the progress of drying and/or curing or after completion, and a step of coating the antifouling coating composition on the mold, and then drying and/or curing the coating composition, and thereafter removing the mold from the surface of the antifouling coating film.

In the case where the method (1-1) is used, the riblet structure can be readily formed on the surface of the antifouling coating film by appropriately selecting the material of the mold and appropriately controlling the timing of pressing the mold and the timing of removing the mold, corresponding to the composition, the curing rate, and coating film properties of the antifouling coating film.

Furthermore, heat and light may be applied during pressing the mold for the purpose of initiating or accelerating the drying or curing reaction of the antifouling coating film.

Examples of the shape of the mold used include a flat plate, a roll, and a film each having the negative structure on the surface thereof. Among these, a flat plate is preferred, and a hard flat plate that is poor in flexibility is more preferred.

The material of the mold is not particularly limited, and a resin material, such as a methacrylic resin, a vinyl chloride resin, and a polycarbonate resin, a metal material, such as aluminum, stainless steel, and titanium, a ceramic material, glass and a composite material thereof may be used.

In the case where the method (1-1) is used, for example, a film having the structure obtained by inverting the concavity and convexity of the target riblet structure of the antifouling coating film of the present invention (i.e., the negative structure) may be used, and thereby the film can also functions as a cover film for the antifouling coating film. Furthermore, for example, the antifouling coating composition may be coated on the surface having the negative structure of the film, followed by drying and/or curing to form the antifouling coating film of the present invention, so as to provide the antifouling coating film with a cover film.

In the method of adhering the antifouling coating film to a surface of a water-contacting structure, the cover film provided can protect the antifouling coating film from damages, such as cut, breakage, and defect, occurring therein during the stages before adhering, such as storage and transportation.

The form of the antifouling coating film with a cover film is not particularly limited, and may be appropriately set depending on the purpose. Specific examples of the planar form thereof include a band form, a strip form, a square form, a elliptical form, and a trapezoidal form.

The method (1-2) is to coat the antifouling coating composition on a substrate or a coating film having the riblet structure on the surface thereof as the underlayer, followed by drying and/or curing, so as to provide the antifouling coating film having the riblet structure on the surface thereof. The riblet structure of the antifouling coating film can be controlled to the target shape by the shape of the riblet structure of the substrate or the coating film as the under layer, and the coating amount, the coating method, and the flowability of the antifouling coating composition.

The riblet structure on the surface of the antifouling coating film formed by the method (1-2) generally has a riblet height h smaller than the height of the riblet structure of the substrate, and thus the value of S/h tends to be large. In particular, this tendency becomes larger with a lower flowability of the antifouling coating composition coated and a larger thickness of the formed coating film, and therefore for providing the target riblet structure on the formed antifouling coating film, it is preferred to select a substrate that has a suitable riblet structure in consideration of these factors. For example, in the case where a coating composition having an ordinary flowability is coated on a substrate having a riblet height of 300 μm to an average thickness of 200 μm, the riblet height of the formed coating film may be approximately 30 μm.

The antifouling coating composition coated by the method described above may be dried and/or cured, for example, by allowing to stand under a condition of 25° C. for a period of approximately in a range of 0.5 to 3 days, so as to provide the coating film. The coating composition may be dried and/or cured with blowing air under heating.

The thickness of the antifouling coating film of the present invention is preferably approximately in a range of 100 to 2,000 μm from the standpoint of the enhancement of the strength of the coating film. Examples of the method for producing the antifouling coating film having the thickness include a method of coating the coating composition once or multiple times to a thickness per one time coating of preferably 30 to 400 μm, and more preferably 50 to 300 μm.

[Water-Contacting Structure with Antifouling Coating Film]

The water-contacting structure with an antifouling coating film of the present invention includes a water-contacting structure having on at least a part of a surface thereof the antifouling coating film.

The water-contacting structure in the present invention means a structure that is used for a purpose that the structure is brought into contact with water, and the water-contacting structure with an antifouling coating film of the present invention means a structure that is used for a purpose that at least a part of the surface having the riblet structure of the antifouling coating film is brought into contact with water.

Examples of the water-contacting structure include a structure used for the purpose of traveling in water, examples of which include a ship (such as an outer hull of a large scale steel ship, e.g., a container ship and a tanker, a fishing boat, an FRP boat, a wooden boat, and a yacht, and a newly built ship and a repaired ship thereof), a fishing material (such as a rope, a fishing net, and a fishing gear), a diver suit, a swimming goggle, an oxygen cylinder, a swim suit, and a torpedo; a structure used for transporting water, examples of which include a water conduit, a water circulation pipe, and a seawater utilization equipment (such as a seawater pump); and other various structures, examples of which include a marine cable, a mega-float, a buoy, a gulf road, an undersea tunnel, and a seaport equipment.

The water-contacting structure with an antifouling coating film of the present invention is preferably a structure used for the purpose of traveling in water or a structure used for transporting water from the standpoint that the utilization of the effect of decreasing the water flow frictional resistance is expected by the riblet structure on the surface, and is more preferably a ship from the standpoint that the good antifouling property and the effect of decreasing the water flow frictional resistance can be obtained.

The water-contacting structure with an antifouling coating film of the present invention may have an intermediate layer and/or a pressure-sensitive adhesive layer described later, which each may optionally intervene between the water-contacting structure and the antifouling coating film.

The intermediate layer and the pressure-sensitive adhesive layer may be laminated in any order, and each may be constituted by two or more layers laminated, as far as the layers are provided between the water-contacting structure and the antifouling coating film.

<Intermediate Layer>

Examples of the intermediate layer include layers that function as a bonding layer enhancing the bonding force between the upper layer and the lower layer of the intermediate layer, a barrier layer reducing the migration of water and other liquid matters through the intermediate layer, and a substrate layer enhancing the strength of the laminated film structure, and a single layer may have two or more of these functions.

In the intermediate layers described above, the intermediate layer that functions as the bonding layer is not limited, as far as the layer is excellent in adhesiveness between the upper layer and the lower layer of the intermediate layer, and examples thereof include a layer obtained by drying and curing a commercially available tie-coating or primer. In the case where the intermediate layer is in contact with the antifouling coating film containing the curable organopolysiloxane as the upper layer, in particular, a silicone resin tie-coating or a silicone resin primer is preferably used.

In the intermediate layers described above, the intermediate layer that functions as the barrier layer is not limited, as far as the layer has an excellent function reducing the migration of water and other liquid matters through the intermediate layer, and examples thereof include a commercially available anticorrosion coating composition and the water vapor barrier layer described in JP 2015-224334 A.

In the intermediate layers described above, the intermediate layer that functions as the substrate layer is not limited, as far as the layer has a function enhancing the strength of the laminated layer structure, and examples thereof include the layer described in JP 2013-194124 A.

Examples of the intermediate layer include a material, such as a resin, a metal, paper, a nonwoven fabric, a woven fabric, or glass, or a coating film, a film, and a sheet constituted by a composite material obtained by combining these materials.

Examples of the resin used as the material of the intermediate layer include a silicone resin; an acrylic resin; a polyolefin resin; a polyvinyl resin; a (co)polymer of an unsaturated monomer, such as polystyrene; a polyester resin, such as polyethylene terephthalate, polybutylene terephthalate, and polyethylene naphthalate; a polyurethane resin; an epoxy resin; a polyacetal; a polycarbonate; an acetyl cellulose; and a composite material thereof.

Examples of the metal constituting the intermediate layer include ones constituted by one or more kinds of various metal elements selected from the group consisting of iron, aluminum, titanium, copper, and the like.

Examples of the paper constituting the intermediate layer include non-coated paper for printing, such as high-quality paper and medium-quality paper, and coated paper, such as art paper and coat paper, and also include ones referred to as Japanese paper and tissue paper.

Among these, for the intermediate layer that mainly functions as the bonding layer, a resin is preferably used as the material therefor, and a silicone resin and a (co)polymer of an unsaturated monomer are preferably used as the material therefor, from the standpoint of the adhesiveness and the convenience in production; for the intermediate layer that mainly functions as the barrier layer, a resin is preferably used as the material therefor, and a silicone resin, a (co)polymer of an unsaturated monomer, and an epoxy resin are more preferably used as the material therefor, from the standpoint of the water resistance and the convenience in production; and for the intermediate layer that mainly functions as the substrate layer, a resin, a metal, and paper are preferably used as the material therefor, and in the case where a resin is used as the substrate, a (co)polymer of an unsaturated monomer and a polyurethane resin are more preferred.

<Pressure-Sensitive Adhesive Layer>

The pressure-sensitive adhesive layer used may be any appropriate pressure-sensitive adhesive layer within such a range that does not impair the effects of the present invention, and for example, the pressure-sensitive adhesive layer described in JP 2013-194124 A may be used. Examples of the material for the pressure-sensitive adhesive layer include an acrylic resin pressure-sensitive adhesive, an epoxy resin pressure-sensitive adhesive, an amino resin pressure-sensitive adhesive, a vinyl resin (such as a vinyl acetate polymer) pressure-sensitive adhesive, a curable acrylic resin pressure-sensitive adhesive, and a silicone resin pressure-sensitive adhesive. The material for the pressure-sensitive adhesive layer may be used alone or as a combination of two or more kinds thereof.

The pressure-sensitive adhesive layer may be a product commercially available as a substrateless tape, and examples thereof include a substrateless silicone tape "NSD-100", manufactured by Nippa Co., Ltd.

The thickness of the pressure-sensitive adhesive layer is preferably 10 to 150 μm, and more preferably 20 to 100 μm, from the standpoint of the pressure-sensitive adhesive force and the handleability.

One of preferred embodiments of the water-contacting structure with an antifouling coating film of the present invention is a water-contacting structure with an antifouling coating film including, in this order, a water-contacting structure, a cured coating film of an anticorrosion coating composition as the intermediate layer mainly having a function of a barrier layer, a cured coating film of a silicone resin tie-coating as the intermediate layer mainly having a function as a bonding layer, and the antifouling coating film of the present invention. The water-contacting structure with an antifouling coating film that has the embodiment is preferred since the structure is excellent particularly in adhesiveness among the layers and water resistance.

Another one of preferred embodiments of the water-contacting structure with an antifouling coating film of the present invention is a water-contacting structure with an antifouling coating film including, in this order, a water-contacting structure, a cured coating film of an anticorrosion coating composition as the intermediate layer mainly having a function of a barrier layer and a bonding layer, and the antifouling coating film of the present invention. The water-contacting structure with an antifouling coating film that has the embodiment is preferred since the structure is excellent particularly in convenience in construction and water resistance.

Still another one of preferred embodiments of the water-contacting structure with an antifouling coating film of the present invention is a water-contacting structure with an antifouling coating film including, in this order, a water-contacting structure and the antifouling coating film of the present invention. The water-contacting structure with an antifouling coating film that has the embodiment is preferred since the structure is excellent particularly in convenience in construction.

The method of manufacturing the water-contacting structure with an antifouling coating film of the present invention is not particularly limited, and examples thereof include (2-1) a method of coating the antifouling coating composition on a water-contacting structure or an intermediate layer formed as an upper layer thereon, and during or after completing drying and/or curing the coating composition, forming the riblet structure on the surface of the antifouling coating film by the method of transferring or the like described above, (2-2) a method of coating the antifouling coating composition on a mold, and during or after completing drying and/or curing the coating composition, adhering the surface of the antifouling coating film opposite to the surface in contact with the mold to a water-contacting structure or an intermediate layer formed as an upper layer thereon, (2-3) a method of coating the antifouling coating composition on a water-contacting structure or an intermediate layer formed as an upper layer thereon having the riblet structure on the surface thereof, followed by drying and/or curing the coating composition to form an antifouling coating film having the riblet structure, and (2-4) a method of forming an antifouling tape described later having an antifouling coating film having the riblet structure on the surface thereof, which is formed by the method of transferring or the like described above and a pressure-sensitive adhesive layer provided on the surface of the antifouling coating film opposite to the surface having the riblet structure via an optional intermediate layer, and adhering the antifouling tape to a water-contacting structure or an intermediate layer formed as an upper layer thereon via the pressure-sensitive adhesive layer. Among these methods, the methods (2-1), (2-2), and (2-3) are preferred from the standpoint of the achievement of the water-contacting structure with an antifouling coating film having firm adhesiveness, the methods (2-1), (2-2), and (2-4) are preferred from the standpoint of the easiness in providing the precise riblet structure on the surface, and the method (2-4) is preferred from the standpoint of the convenience in workability in adhering. The methods (2-1) to (2-4) may be used in combination.

As for the antifouling coating film with a cover film described above, the water-contacting structure with an antifouling coating film can be produced, for example, in such a manner that in the method (2-4), the antifouling coating film with a cover film is adhered to the water-contacting structure or the intermediate layer formed as an upper layer thereon directly or via an optional pressure-sensitive adhesive layer or the like, and then the cover film is removed from the antifouling coating film by bringing into contact with water.

[Antifouling Tape]

The antifouling tape of the present invention includes an antifouling layer containing the antifouling coating film described above and a pressure-sensitive adhesive layer, the antifouling layer and the pressure-sensitive adhesive layer are laminated directly or via an optional intermediate layer, and the antifouling layer has a riblet structure at least on a surface opposite to the pressure-sensitive adhesive layer.

The antifouling tape of the present invention may have a structure, in which the antifouling layer and the pressure-sensitive layer are laminated directly on each other, or a structure, in which the antifouling layer and the pressure-sensitive layer are laminated via an optional intermediate layer.

Examples of the intermediate layer include at least one kind selected from the group consisting of a substrate layer, a bonding layer, and a barrier layer. The intermediate layer may be constituted by one layer or two or more layers, as far as the layer is provided between the antifouling layer and the pressure-sensitive adhesive layer, and in the case where two or more layers are laminated, the layers may be the same as or different from each other, and may be laminated in any order.

The specific embodiments and the preferred embodiments of the pressure-sensitive adhesive layer and the intermediate layer in the antifouling tape are the same as the pressure-sensitive adhesive layer and the intermediate layer described for the water-contacting structure above.

It suffices that the antifouling tape of the present invention has the riblet structure at least one surface of the antifouling layer (i.e., the surface thereof opposite to the pressure-sensitive adhesive layer). The interface shape of the antifouling layer on the side of the pressure-sensitive adhesive layer in the antifouling tape may be flat or may have concavity and convexity, such as a riblet structure.

The method for forming the antifouling layer in the antifouling tape of the present invention is not particularly limited, and is preferably (3-1) a method of transferring a surface shape of a mold having a negative structure of the riblet structure to the surface of the antifouling layer, or (3-2) a method of forming a substrate layer having the riblet structure and forming the antifouling layer on the substrate layer, so as to form the riblet structure on the surface of the antifouling layer opposite to the substrate layer, and more preferably the method (3-1).

In the method (3-1), the antifouling layer can be formed according to the method (1-1) described for the method of manufacturing the antifouling coating film.

In the method (3-2), the antifouling layer can be formed according to the method (1-2) described for the method of manufacturing the antifouling coating film. Examples of the method for forming the substrate layer having the riblet structure used in the method (3-2) include a method of forming the substrate layer on a mold having the riblet structure in such a manner that the surface thereof opposite to the surface in contact with the mold is flat, and then removing the mold.

The antifouling tape of the present invention may be produced in an arbitrary method. Examples of the method include (4-1) a method of adhering the pressure-sensitive adhesive layer to the surface of the antifouling layer formed by the method (3-1) opposite to the surface having the riblet structure formed thereon, or coating a pressure-sensitive adhesive layer forming material thereon to form the pressure-sensitive adhesive layer, (4-2) a method of adhering the pressure-sensitive adhesive layer to the surface of the substrate layer formed by the method (3-2) opposite to the antifouling layer, or coating a pressure-sensitive adhesive layer forming material thereon to form the pressure-sensitive adhesive layer, (4-3) a method of coating a pressure-sensitive adhesive layer forming material on one surface of the substrate layer to form the pressure-sensitive adhesive layer, and forming the antifouling layer on the other surface of the substrate layer by the method (3-1) or the method (3-2), and (4-4) a method of co-extruding a substrate layer forming material and a pressure sensitive adhesive layer forming material to form a laminate of the substrate layer and the pressure-sensitive adhesive layer, and then forming the antifouling layer on the surface of the substrate layer opposite to the pressure-sensitive adhesive layer by the method (3-1).

The pressure-sensitive adhesive force of the pressure-sensitive adhesive layer in the antifouling tape of the present invention is preferably 5 to 30 N/25 mm. The pressure-sensitive adhesive force of the pressure-sensitive adhesive layer is the pressure-sensitive adhesive force to SUS 304 as an adherend at a peeling angle of 180° according to JIS Z0237:2009.

The shape of the antifouling tape of the present invention is not particularly limited, and may be appropriately set depending on the purpose. Specific examples of the planar form thereof include a band form, a strip form, a square form, a elliptical form, and a trapezoidal form.

The antifouling tape may have the structures described in JP 2013-194124 A and JP 2016-124994 A.

The adhesion of the antifouling tape includes a case where the antifouling tape is adhered to only a part of a water-contacting structure and a case where plural tapes are adhered thereover adjacently to each other, and these cases may have a problem of detachment and contamination proceeding at the tape end and the gap between the tapes if any. Accordingly, the tape end may be sealed by coating the antifouling coating composition of the present invention, and the method of using the easily adhesive pressure-sensitive adhesive tape described in JP 2013-155232 A and JP 2013-155233 A may also be used.

As the adhering device, for example, the device described in WO 2016/193326 may also be used.

EXAMPLES

The present invention will be described more specifically with reference to examples below, but the present invention is not limited to the examples.

[Production of Polymer (C22) Solution]
<Production Example of Solution of Polymer (C22-1)>

The reaction was performed under ordinary pressure in a nitrogen atmosphere. 42.86 g of methyl amyl ketone was charged in a reaction vessel equipped with a stirrer, a reflux condenser, a thermometer, a nitrogen introducing tube, and a dropping funnel, and heated to an internal temperature of 100° C. under stirring. While retaining the temperature of methyl amyl ketone in the reaction vessel to 100±5° C., a mixture containing 40.0 g of NK Ester AM-90G (methoxy polyethylene glycol acrylate, repetition number of polyethylene glycol: 9 in average, manufactured by Shin-Nakamura Chemical Co., Ltd.), 60.0 g of isobutyl acrylate, and 4.0 g of 2,2'-azobis(2-methylbutyronitrile) was added dropwise to the reaction vessel over 4 hours. Thereafter, the reaction mixture was stirred at the temperature range retaining for 2 hours, so as to provide a solution of a polymer (C22-1) having a solid content of 70.3% by mass, a viscosity of 109 mPa·s, and a weight average molecular weight (Mw) of 9,100.

[Evaluation Method for Polymer and Polymer Solution]
<Solid Content (% by mass) of Polymer Solution>

1.0 g ($X_1$) of the polymer solution was retained in a thermostat chamber retained under a condition of 1 atm and 108° C. for 3 hours, so as to remove the volatile component to provide the non-volatile component. The amount ($X_2$ (g)) of the non-volatile component was measured, and the amount of the solid content (% by mass) contained in the polymer solution was calculated by the following expression.

Solid content (% by mass) of solution of polymer=$X_2/X_1 \times 100$

<Viscosity of Polymer Solution>

The viscosity (unit: mPa·s) of the polymer solution at a liquid temperature of 25° C. was measured with an E-type viscometer (TV-25, manufactured by Toki Sangyo Co., Ltd.).

<Average Molecular Weight of Polymer>

The weight average molecular weight (Mw) of the polymer was measured by gel permeation chromatography (GPC) under the following condition.

(GPC Condition)
Equipment: "HLC-8220GPC" (manufactured by Tosoh Corporation)
Columns: "TSKgel Super H2000"+"TSKgel Super H4000" (6 mm (inner diameter), 15 cm (length), all manufactured by Tosoh Corporation) connected to each other
Eluent: tetrahydrofuran (THF)
Flow rate: 0.500 mL/min
Detector: RI
Column thermostat chamber temperature: 40° C.
Standard substance: polystyrene
Preparation method of specimen: The polymer solution prepared was diluted by adding THF thereto, and then filtered with a membrane filter to provide a filtrate, which was designated as a specimen for the GPC measurement.

[Coating Composition]

Mixed Components

The mixed components used in the coating composition are shown in Tables 1 and 2.

The kneaded product of the curable organopolysiloxane and the inorganic filler (silica) (D) shown in Table 1 was obtained by using the curable organopolysiloxane and the inorganic filler (silica) (D) in the amounts shown in Table 1 and kneading by a known method.

TABLE 1

| | | Compound name | Chemical formula, characteristics, manufacturer, etc. |
|---|---|---|---|
| (A) | Curable organopolysiloxane | silanol group-containing organopolysiloxane | HO—[Si(CH$_3$)$_2$—O—]$_n$-H weight average molecular weight: 28,500, viscosity: 2,100 mPa · s |
| | | oxime silyl group-containing organopolysiloxane (*1) | (MEKO)$_2$(CH$_2$=CH—)SiO—[Si(CH$_3$)$_2$—O—]$_n$-Si(CH=CH$_2$)(MEKO)$_2$ weight average molecular weight: 35,000, viscosity: 1,500 mPa · s |
| (D) | Silica | non-treated silica | Aerosil 200, manufactured by Nippon Aerosil Co., Ltd. |
| | | hydrophobic treated silica | Aerosil RX200, manufactured by Nippon Aerosil Co., Ltd. |
| Kneaded product of (A) and (D) (1) | | | kneaded product of silanol group-containing organopolysiloxane and hydrophobic treated silica amount of component (D) per 100 parts by mass of component (A): 10 parts by mass, viscosity: 5,000 mPa · s |
| Kneaded product of (A) and (D) (2) | | | kneaded product of oxime silyl group-containing organopolysiloxane and non-treated silica amount of component (D) per 100 parts by mass of component (A): 10 parts by mass, viscosity: 40 Pa · s |
| Kneaded product of (A) and (D) (3) | | | kneaded product of oxime silyl group-containing organopolysiloxane and hydrophobic treated silica amount of component (D) per 100 parts by mass of component (A): 10 parts by mass, viscosity: 800 Pa · s |

(*1): "MEKO" shows a methyl ethyl ketoxime group.

TABLE 2

| | | Compound name | Chemical formula, characteristics, manufacturer, etc. |
|---|---|---|---|
| (B) | Organism repellent | copper pyrithione | "Copper Omadine Powder", manufactured by Arch UK Biocides, Ltd. chemical formula: Cu(—S—C$_5$H$_4$N—O—)$_2$ |
| | | zinc pyrithione | "Zinc Omadine Powder", manufactured by Arch UK Biocides, Ltd. chemical formula: Zn(—S—C$_5$H$_4$N—O—)$_2$ |
| (C1) | Silicone oil | phenyl-modified polydimethylsiloxane | "KF-50-1,000CS", manufactured by Shin-Etsu Chemical Co., Ltd. phenyl modification rate: 5%, viscosity: 1,000 mPa · s |
| | | ether-modified polydimethylsiloxane | chemical formula: H$_3$C—[Si(CH$_3$)$_2$—O—]$_n$-[Si(CH$_3$)((—C$_2$H$_4$—O—)$_l$(-C$_3$H$_6$—O—)$_c$—R)—]$_m$-CH$_3$ viscosity: 1,700 mPa · s |
| (E) | Silane coupling agent | 3-(2-aminoethylamino)-propyltrimethoxysilane | "KBM-603", manufactured by Shin-Etsu Chemical Co., Ltd. |
| (F) | Organosilicon crosslinking agent | organosilane partially hydrolytic condensate | "Wacker Silicate TES 40 WN", manufactured by Wacker Asahikasei Silicone Co., Ltd. chemical formula: H$_5$C$_2$O—[Si(OC$_2$H$_5$)$_2$—O—]$_t$—C$_2$H$_5$ |
| (G) | Curing catalyst | dibutyltin dilaurate | "Gleck TL", manufactured by DIC Corporation |
| (I) | Coloring pigment | titanium oxide | "Tipaque PFC105", manufactured by Ishihara Sangyo Kaisha, Ltd. |
| | | black iron oxide | "KN 320", manufactured by Toda Kogyo Corporation |
| (J) | Organic solvent | xylene | — |
| | | acetylacetone | — |

PRODUCTION EXAMPLES 1 TO 8

<Production of Coating Composition>

The components were mixed by stirring according to the mixing amounts (part by mass) shown in Table 3, so as to provide multi-component coating compositions each constituted by plural components (Production Examples 1 to 7) and a single component coating composition constituted only by a base component (Production Example 8).

In the case where the multi-component coating composition was coated, the components were sufficiently mixed and stirred uniformly with a disperser before use.

TABLE 3

| Coating composition (part by mass) | | | Production Example 1 | 2 | 3 | 4 | 5 | 6 | 7 | 8 |
|---|---|---|---|---|---|---|---|---|---|---|
| Base component | (A) | silanol group-containing organopolysiloxane | 35.0 | 35.0 | 35.0 | 35.0 | 35.0 | 35.0 | 35.0 | |
| | (A) and (D) | silanol group-containing organopolysiloxane/ hydrophobic treated silica kneaded product (1) | 25.0 | 25.0 | 25.0 | 25.0 | 25.0 | 25.0 | 25.0 | |
| | | oxime silyl group-containing organopolysiloxane/non-treated silica kneaded product (2) | | | | | | | | 40.0 |
| | | oxime silyl group-containing organopolysiloxane-non-treated silica kneaded product (3) | | | | | | | | 15.0 |
| | (B) | copper pyrithione | 5.0 | 5.0 | 5.0 | 5.0 | 5.0 | | | 5.0 |
| | | zinc pyrithione | | | | | | 5.0 | 5.0 | |
| | (C1) | phenyl-modified polydimethylsiloxane | | | | | | | | 5.0 |
| | (C2) | polymer (C22-1) (solid content: 70.3% by mass) | | 10.0 | | 10.0 | | | 10.0 | 3.0 |
| | (E) | 3-(2-aminoethylamino)-propyltrimethoxysilane | | | | | | | | 0.1 |
| | (F) | organosilane partial hydrolysis condensate | | | | | | | | 3.0 |
| | (I) | titanium oxide | 3.0 | 3.0 | 3.0 | 3.0 | 3.0 | | | 5.0 |
| | | black iron oxide | | | | | | 1.0 | 1.0 | |
| | (J) | Xylene | 19.0 | 9.0 | 13.0 | 3.0 | 6.0 | 15.0 | 5.0 | 23.9 |
| | | Subtotal of base component (part by mass) | 87.0 | 87.0 | 81.0 | 81.0 | 74.0 | 81.0 | 81.0 | 100.0 |
| Curing agent | (C1) | phenyl-modified polydimethylsiloxane | | | 6.0 | 6.0 | 6.0 | 6.0 | 6.0 | |
| | | ether-modified polydimethylsiloxane | | | | | 7.0 | | | |
| | (F) | organosilane partial hydrolysis condensate | 3.0 | 3.0 | 3.0 | 3.0 | 3.0 | 3.0 | 3.0 | |
| | (G) | dibutyltin dilaurate | 0.6 | 0.6 | 0.6 | 0.6 | 0.6 | 0.6 | 0.6 | |
| | (J) | Acetylacetone | 5.4 | 5.4 | 5.4 | 5.4 | 5.4 | 5.4 | 5.4 | |
| | | Xylene | 3.0 | 3.0 | 3.0 | 3.0 | 3.0 | 3.0 | 3.0 | |
| | | Subtotal of curing agent component (part by mass) | 12.0 | 12.0 | 18.0 | 18.0 | 25.0 | 18.0 | 18.0 | |
| Additive | (E) | 3-(2-aminoethylamino)-propyltrimethoxysilane | 0.1 | 0.1 | 0.1 | 0.1 | 0.1 | 0.1 | 0.1 | |
| | (J) | Xylene | 0.9 | 0.9 | 0.9 | 0.9 | 0.9 | 0.9 | 0.9 | |
| | | Subtotal of additive component (part by mass) | 1.0 | 1.0 | 1.0 | 1.0 | 1.0 | 1.0 | 1.0 | |
| | | Total (part by mass) | 100.0 | 100.0 | 100.0 | 100.0 | 100.0 | 100.0 | 100.0 | 100.0 |

<Production of Antifouling Coating Film>

Example 1

An epoxy anticorrosion coating composition ("Bannoh 500", manufactured by Chugoku Marine Paints, Ltd.) was coated on a test plate formed of polyvinyl chloride by air spraying to an average thickness of 100 μm after drying (curing), and dried (cured) at ordinary temperature (23° C.) for 6 hours. Subsequently, a silicone resin tie-coating ("CMP Bioclean Tie-coat", manufactured by Chugoku Marine Paints, Ltd.) was coated by air spraying to an average thickness of 100 μm after drying (curing), and dried (cured) at ordinary temperature for 6 hours, so as to provide an intermediate layer. Thereafter, the coating composition of Production Example 1 was coated on the intermediate layer at ordinary temperature to an average thickness of 200 μm after drying (curing). After drying (curing) at ordinary temperature for 10 minutes, a PMMA panel having a V-shaped groove surface structure having an apex angle of 90° and a pitch of 0.1 mm ("LPV90-0.1", manufactured by Nihon Tokushu Kogaku Jushi Co., Ltd.) as a mold was placed on the coating film during drying (curing), followed by drying (curing) for 24 hours, and then the mold was removed to provide an antifouling coating film having a riblet structure on the surface thereof. The surface of the resulting antifouling coating film was observed with a digital microscope ("VHX-900", manufactured by Keyence Corporation), and it was found that the riblet structure having a riblet height h of 40 μm, a pitch S (μm) of the groove structure of 100 μm, and S/h of 2.5 was provided.

Example 2

An antifouling coating film was obtained in the same manner as in Example 1 except that the coating composition used in Example 1 was changed to the composition of Production Example 2. The surface of the resulting antifouling coating film was similarly observed, and it was found that the riblet structure having a riblet height h of 40 μm, a pitch S (μm) of the groove structure of 100 μm, and S/h of 2.5 was provided.

Examples 3 and 9

An antifouling coating film was obtained in the same manner as in Example 1 except that the coating composition used in Example 1 was changed to the composition of Production Example 3. The surface of the resulting antifouling coating film was similarly observed, and it was found that the riblet structure having a riblet height h of 40 μm, a pitch S (μm) of the groove structure of 100 μm, and S/h of 2.5 was provided.

Example 4

An antifouling coating film was obtained in the same manner as in Example 3 except that the mold used in Example 3 was changed to a PMMA panel having a V-shaped groove surface structure having an apex angle of 90° and a pitch of 0.05 mm ("LPV90-0.05", manufactured by Nihon Tokushu Kogaku Jushi Co., Ltd.). The surface of the resulting antifouling coating film was similarly observed, and it was found that the riblet structure having a riblet height h of 16 pin, a pitch S (μm) of the groove structure of 50 μm, and S/h of 3.1 was provided.

Example 5

An antifouling coating film was obtained in the same manner as in Example 3 except that the mold used in Example 3 was changed to a PMMA panel having a V-shaped groove surface structure having an apex angle of 90° and a pitch of 0.01 mm ("LPV90-0.01", manufactured by Nihon Tokushu Kogaku Jushi Co., Ltd.). The surface of the resulting antifouling coating film was similarly observed, and it was found that the riblet structure having a riblet height h of 5 μm, a pitch S (μm) of the groove structure of 10 μm, and S/h of 2.0 was provided.

Example 6

An antifouling coating film was obtained in the same manner as in Example 3 except that the mold used in Example 3 was changed to a PMMA panel having a V-shaped groove surface structure having an apex angle of 40° and a pitch of 0.05 mm ("LPV40-0.05", manufactured by Nihon Tokushu Kogaku Jushi Co., Ltd.). The surface of the resulting antifouling coating film was similarly observed, and it was found that the riblet structure having a riblet height h of 50 μm, a pitch S (μm) of the groove structure of 50 μm, and S/h of 1.0 was provided.

Example 7

An antifouling coating film was obtained in the same manner as in Example 3 except that the mold used in Example 3 was changed to a PMMA panel having a V-shaped groove surface structure having an apex angle of 60° and a pitch of 0.1 mm ("LPV60-0.1", manufactured by Nihon Tokushu Kogaku Jushi Co., Ltd.). The surface of the resulting antifouling coating film was similarly observed, and it was found that the riblet structure having a riblet height h of 80 μm, a pitch S (μm) of the groove structure of 100 μm, and S/h of 1.3 was provided.

Example 8

An antifouling coating film was obtained in the same manner as in Example 3 except that the mold used in Example 3 was changed to a PMMA panel having a V-shaped groove surface structure having an apex angle of 65° and a pitch of 0.1 mm ("LPV65-0.1", manufactured by Nihon Tokushu Kogaku Jushi Co., Ltd.). The surface of the resulting antifouling coating film was similarly observed, and it was found that the riblet structure having a riblet height h of 70 μm, a pitch S (μm) of the groove structure of 100 μm, and S/h of 1.4 was provided.

Example 10

An antifouling coating film was obtained in the same manner as in Example 1 except that the coating composition used in Example 1 was changed to the composition of Production Example 4. The surface of the resulting antifouling coating film was similarly observed, and it was found that the riblet structure having a riblet height h of 40 μm, a pitch S (μm) of the groove structure of 100 μm, and S/h of 2.5 was provided.

Example 11

An antifouling coating film was obtained in the same manner as in Example 4 except that the coating composition used in Example 4 was changed to the composition of Production Example 4. The surface of the resulting antifouling coating film was similarly observed, and it was found that the riblet structure having a riblet height h of 16 μm, a pitch S (μm) of the groove structure of 50 μm, and S/h of 3.1 was provided.

Example 12

An antifouling coating film was obtained in the same manner as in Example 7 except that the coating composition used in Example 7 was changed to the composition of Production Example 4. The surface of the resulting antifouling coating film was similarly observed, and it was found that the riblet structure having a riblet height h of 80 μm, a pitch S (μm) of the groove structure of 100 μm, and S/h of 1.3 was provided.

Example 13

An antifouling coating film was obtained in the same manner as in Example 8 except that the coating composition used in Example 8 was changed to the composition of Production Example 4. The surface of the resulting antifouling coating film was similarly observed, and it was found that the riblet structure having a riblet height h of 70 μm, a pitch S (μm) of the groove structure of 100 μm, and S/h of 1.4 was provided.

Example 14

An antifouling coating film was obtained in the same manner as in Example 1 except that the coating composition used in Example 1 was changed to the composition of Production Example 5. The surface of the resulting antifouling coating film was similarly observed, and it was found that the riblet structure having a riblet height h of 40 µm, a pitch S (µm) of the groove structure of 100 µm, and S/h of 2.5 was provided.

Example 15

An antifouling coating film was obtained in the same manner as in Example 1 except that the coating composition used in Example 1 was changed to the composition of Production Example 8. The surface of the resulting antifouling coating film was similarly observed, and it was found that the riblet structure having a riblet height h of 40 µm, a pitch S (µm) of the groove structure of 100 µm, and S/h of 2.5 was provided.

Examples 16 and 18

An antifouling coating film was obtained in the same manner as in Example 1 except that the coating composition used in Example 1 was changed to the composition of Production Example 6. The surface of the resulting antifouling coating film was similarly observed, and it was found that the riblet structure having a riblet height h of 40 µm, a pitch S (µm) of the groove structure of 100 µm, and S/h of 2.5 was provided.

Example 17

An antifouling coating film was obtained in the same manner as in Example 16 except that the mold used in Example 16 was changed to a PMMA panel having a V-shaped groove surface structure having an apex angle of 90° and a pitch of 0.05 mm ("LPV90-0.05", manufactured by Nihon Tokushu Kogaku Jushi Co., Ltd.). The surface of the resulting antifouling coating film was similarly observed, and it was found that the riblet structure having a riblet height h of 16 µm, a pitch S (µm) of the groove structure of 50 µm, and S/h of 3.1 was provided.

Example 19

An antifouling coating film was obtained in the same manner as in Example 1 except that the coating composition used in Example 1 was changed to the composition of Production Example 7. The surface of the resulting antifouling coating film was similarly observed, and it was found that the riblet structure having a riblet height h of 40 µm, a pitch S (µm) of the groove structure of 100 µm, and S/h of 2.5 was provided.

Comparative Example 1

An antifouling coating film having no riblet structure on the surface thereof was obtained in the same manner as in Example 1 except that the operation of placing the mold in Example 1 was omitted.

Comparative Example 2

An antifouling coating film having no riblet structure on the surface thereof was obtained in the same manner as in Example 2 except that the operation of placing the mold in Example 2 was omitted.

Comparative Example 3

An antifouling coating film having no riblet structure on the surface thereof was obtained in the same manner as in Example 3 except that the operation of placing the mold in Example 3 was omitted.

Comparative Example 4

An antifouling coating film having no riblet structure on the surface thereof was obtained in the same manner as in Example 10 except that the operation of placing the mold in Example 10 was omitted.

Comparative Example 5

An antifouling coating film having no riblet structure on the surface thereof was obtained in the same manner as in Example 14 except that the operation of placing the mold in Example 14 was omitted.

Comparative Example 6

An antifouling coating film having no riblet structure on the surface thereof was obtained in the same manner as in Example 15 except that the operation of placing the mold in Example 15 was omitted.

Comparative Example 7

An antifouling coating film having no riblet structure on the surface thereof was obtained in the same manner as in Example 16 except that the operation of placing the mold in Example 16 was omitted.

Comparative Example 8

An antifouling coating film having no riblet structure on the surface thereof was obtained in the same manner as in Example 19 except that the operation of placing the mold in Example 19 was omitted.

<Evaluation of Elution Rate>

The test plates having the antifouling coating film formed thereon produced in Examples 1 to 19 and Comparative Examples 1 to 8 each were mounted on the side surface of a rotor. The test plates of Examples 1 to 19 each were mounted in such a manner that the longitudinal direction of the riblet grooves of the antifouling coating film was horizontal with respect to the rotation direction of the rotor, i.e., the water flow, for the test plates of Examples 1 to 8, 10 to 17, and 19, and perpendicular thereto for the test plates of Examples 9 and 18.

The rotor was rotated in seawater at 25° C. at a speed providing a speed at the surface of the antifouling coating film of approximately 15 knot for 4 months. Thereafter, the cross section of the coating film was observed with a digital microscope ("VHX-900", manufactured by Keyence Corporation), and the thickness of the layer where copper pyrithione or zinc pyrithione disappeared from the surface of the coating film (i.e., the disappearance depth) was measured based on the difference in hue. In the case where the surface of the antifouling coating film had the riblet structure, the disappearance depth at the apex portion and the disappearance depth at the bottom portion of the groove were measured for three points each, and the average value of the resulting values was obtained, and in the case where the surface of the antifouling coating film flat, arbitrary three points were measured, and the average value of the resulting values was obtained, which each were designated as the evaluation value for the elution rate of the organism repellent (B).

In the antifouling coating films having the riblet structure on the surface thereof in Examples, the suppression rate of disappearance of the organism repellent (B) was calculated based on the flat antifouling coating films using the same coating composition in Comparative Examples according to the following expression.

Suppression rate of disappearance (%)=(1−(disappearance depth in Example/disappearance depth in Comparative Example using the same coating composition))×100

The results were as shown in Tables 4-1 to 4-3. A smaller value for the disappearance depth means a lower elution rate of the organism repellent (B) providing excellent sustained release property. A larger value for the suppression rate of disappearance means a higher effect of suppressing the elution of the organism repellent by the riblet structure on the surface of the antifouling coating film. In the description herein, a suppression rate of disappearance of 5% or more was evaluated that the effect of suppressing the elution of the organism repellent was exhibited, a suppression rate of disappearance of 9% or more was evaluated that the effect was excellent, and a suppression rate of disappearance of 11% or more was evaluated that the effect was more excellent.

TABLE 4-1

| | Example 1 | Comparative Example 1 | Example 2 | Comparative Example 2 | Example 3 | Example 4 | Example 5 | Example 6 | Example 7 | Example 8 | Example 9 | Comparative Example 3 |
|---|---|---|---|---|---|---|---|---|---|---|---|---|
| Production example of coating composition | 1 | 1 | 2 | 2 | 3 | 3 | 3 | 3 | 3 | 3 | 3 | 3 |
| Riblet height h (μm) | 40 | — | 40 | — | 40 | 16 | 5 | 50 | 80 | 70 | 40 | — |
| Pitch S (μm) | 100 | — | 100 | — | 100 | 50 | 10 | 50 | 100 | 100 | 100 | — |
| S/h (—) | 2.5 | — | 2.5 | — | 2.5 | 3.1 | 2.0 | 1.0 | 1.3 | 1.4 | 2.5 | — |
| Mounting method | horizontal | — | horizontal | — | horizontal | horizontal | horizontal | horizontal | horizontal | horizontal | perpendicular | — |
| Disappearance depth (μm) | 42 | 47 | 47 | 58 | 35 | 37 | 38 | 38 | 33 | 37 | 35 | 42 |
| Suppression rate of disappearance | 10% | — | 20% | — | 17% | 11% | 10% | 10% | 22% | 11% | 17% | — |

TABLE 4-2

| | Example 10 | Example 11 | Example 12 | Example 13 | Comparative Example 4 | Example 14 | Comparative Example 5 | Example 15 | Comparative Example 6 |
|---|---|---|---|---|---|---|---|---|---|
| Production example of coating composition | 4 | 4 | 4 | 4 | 4 | 5 | 5 | 8 | 8 |
| Riblet height h (μm) | 40 | 16 | 80 | 70 | — | 40 | — | 40 | — |
| Pitch S (μm) | 100 | 50 | 100 | 100 | — | 100 | — | 100 | — |
| S/h (—) | 2.5 | 3.1 | 1.3 | 1.4 | — | 2.5 | — | 2.5 | — |
| Mounting method | horizontal | horizontal | horizontal | horizontal | — | horizontal | — | horizontal | — |
| Disappearance depth (μm) | 40 | 37 | 47 | 49 | 58 | 37 | 56 | 44 | 56 |
| Suppression rate of disappearance | 32% | 36% | 20% | 16% | — | 33% | — | 21% | — |

TABLE 4-3

| | Example 16 | Example 17 | Example 18 | Comparative Example 7 | Example 19 | Comparative Example 8 |
|---|---|---|---|---|---|---|
| Production example of coating composition | 6 | 6 | 6 | 6 | 7 | 7 |
| Riblet height h (μm) | 40 | 16 | 40 | — | 40 | — |
| Pitch S (μm) | 100 | 50 | 100 | — | 100 | — |
| S/h (—) | 2.5 | 3.1 | 2.5 | — | 2.5 | — |
| Mounting method | horizontal | horizontal | perpendicular | — | horizontal | — |
| Disappearance depth (μm) | 68 | 64 | 65 | 75 | 68 | 86 |

TABLE 4-3-continued

| | Example 16 | Example 17 | Example 18 | Comparative Example 7 | Example 19 | Comparative Example 8 |
|---|---|---|---|---|---|---|
| Suppression rate of disappearance | 9% | 15% | 13% | — | 21% | — |

It is clear from the results of Examples and Comparative Examples shown in Tables 4-1 to 4-3 that according to the present invention, the elution of the organism repellent (B) is suppressed in exposure to a dynamic water flow in water, and an antifouling coating film having excellent sustained release property can be formed.

Example 20

<Production of Antifouling Tape 1>
[Pressure-Sensitive Adhesive Layer]
30 parts by mass of methyl ethyl ketone was charged in a reaction vessel equipped with a condenser, a nitrogen introducing tube, a thermometer, a dropping device, a heating and cooling jacket, and a stirrer, to which a mixture containing 90 parts by mass of 2-ethylhexyl acrylate ("AEH", manufactured by Nippon Shokubai Co., Ltd.), 10 parts by mass of acrylic acid ("98% Acrylic Acid", manufactured by Toagosei Co., Ltd.), 1 part by mass of 2,2'-azobis(2,4-dimethylvaleronitrile) ("ABN-V", manufactured by Japan Finechem, Inc.) as a polymerization initiator, and 16 parts by mass of methyl ethyl ketone was added dropwise over 1 hour from the dropping device while retaining a temperature condition of 80±5° C. under a nitrogen stream. Thereafter, the reaction mixture was stirred at the same temperature for 1 hour, then methyl ethyl ketone was removed through distillation under reduced pressure, and 90 parts by mass of 2-ethylhexyl acrylate ("AEH", manufactured by Nippon Shokubai Co., Ltd.) and 10 parts by mass of acrylic acid ("98% Acrylic Acid", manufactured by Toagosei Co., Ltd.) were added thereto to provide an acrylic monomer mixture.

0.1 part by mass of 2,2-dimethoxy-1,2-diphenylethan-1-one ("Irgacure 651", manufactured by BASF Japan Ltd.) as a photopolymerization initiator and 0.5 part by mass of 1,6-hexanediol diacrylate ("Miramer M200", manufactured by Miwon Specialty Chemical Co., Ltd.) as a crosslinking agent were added to 100 parts by mass of the acrylic monomer mixture, the mixture was coated on a separator ("Subdivided Silicone-treated PET Release Film #38", manufactured by Featherfield Co., Ltd., hereinafter the same for all the separators below), a separator was adhered thereon, and the assembly was irradiated with an ultraviolet ray (ultraviolet ray illuminance: 50 mW/cm², cumulative dose: 2,000 mJ/cm²) with an ultraviolet lamp (mercury lamp), so as to provide a pressure-sensitive adhesive layer 1 having an average thickness of 50 μm.

In the following description, the operation of adhering another film to a cured coating film adhered to a separator, an operation of coating a coating composition thereon, and the like are performed after removing the separator even though such a description is omitted.
[Substrate Layer]
50 parts by mass of isobornyl acrylate ("Lightacrylate IBXA", manufactured by Kyoeisha Chemical Co., Ltd.), 50 parts by mass of acrylic acid ("98% Acrylic Acid", manufactured by Toagosei Co., Ltd.), 68.4 parts by mass of poly(oxytetramethylene) glycol having a number average molecular weight of 650 ("PTMG650", manufactured by Mitsubishi Chemical Corporation) as a polyol, and 0.01 part by mass of dibutyltin dilaurate (DBTL) as a catalyst were charged in a reaction vessel equipped with a condenser, a thermometer, a dropping device, a heating and cooling jacket, and a stirrer, to which 25.5 parts by mass of hydrogenated xylylene diisocyanate ("HXDI", manufactured by Mitsui Chemical Polyurethane, Inc.) was added dropwise under stirring, followed by reacting at 65° C. for 5 hours, and then 6.1 parts by mass of 2-hydroxyethyl acrylate ("BHEA", manufactured by Nippon Shokubai Co., Ltd.) was added, followed by reacting at 65° C. for 1 hour, so as to provide an acryloyl group-terminated urethane polymer-acrylic monomer mixture. 1 part by mass of 3-acryloxypropyltrimethoxysilane ("KBM-5103", manufactured by Shin-Etsu Chemical Co., Ltd.), 0.25 part by mass of diphenyl(2, 4,6-trimethoxybenzoyl)phosphine oxide ("Lucirin TPO", manufactured by BASF Japan Ltd.) as a photopolymerization initiator, 1.25 parts by mass of a photostabilizer ("Tinuvin 123", manufactured by BASF Japan Ltd.), and 0.6 part by mass of an ultraviolet ray absorbent ("Tinuvin 400", manufactured by BASF Japan Ltd.) were added to the resulting acryloyl group-terminated urethane polymer-acrylic monomer mixture, so as to provide a substrate layer syrup 1.

The resulting substrate layer syrup 1 was coated on a separator with a film applicator, on which a separator was adhered, and the assembly was irradiated with an ultraviolet ray (ultraviolet ray illuminance: 50 mW/cm², cumulative dose: 2,000 mJ/cm²) with an ultraviolet lamp (mercury lamp), so as to provide a substrate layer 1 having an average thickness of 150 μm.
[Antifouling Tape]
The coating composition of Production Example 3 was coated on a PMMA panel having a V-shaped groove surface structure having an apex angle of 90° and a pitch of 0.1 mm ("LPV90-0.1", manufactured by Nihon Tokushu Kogaku Jushi Co., Ltd.) as a mold by air spraying to an average dry thickness of 200 μm, and dried (cured) at ordinary temperature for 4 hours to form an antifouling layer.

A silicone resin tie-coating ("CMP Bioclean Tie-coat", manufactured by Chugoku Marine Paints, Ltd.) was coated on the substrate layer 1 obtained in the aforementioned manner to an average dry thickness of 100 μm by air spraying, and dried (cured) at ordinary temperature for 10 minutes, and then the antifouling layer was placed on the substrate layer 1 in such a manner that the surface of the substrate layer 1 having the silicone resin tie-coating coated thereon was brought into contact with the surface of the antifouling layer opposite to the mold. The assembly was cured (dried) at ordinary temperature for 24 hours, and then the pressure-sensitive adhesive layer 1 obtained in the aforementioned manner was adhered to the surface of the substrate layer 1 opposite to the surface in contact with the silicone resin tie-coating, followed by removing the mold, so as to provide an antifouling tape 1. The surface of the antifouling layer was observed with a digital microscope, and it was found that the riblet structure having a riblet height h of 40 µm, a pitch S (µm) of the groove structure of 100 µm, and S/h of 2.5 was provided.

Example 21

<Production of Antifouling Tape 2>

The coating composition of Production Example 3 was coated on a surface having a groove structure of a PMMA panel having a V-shaped groove surface structure having an apex angle of 90° and a pitch of 0.05 mm ("LPV90-0.05", manufactured by Nihon Tokushu Kogaku Jushi Co., Ltd.) as a mold to have an average dry thickness of 200 µm, and dried (cured) at ordinary temperature for 3 hours to form an antifouling layer. A substrateless silicone tape "NSD-100", manufactured by Nippa Co., Ltd., as a pressure-sensitive adhesive layer was adhered to the surface of the antifouling layer opposite to the surface in contact with the mold, and the mold was removed to provide an antifouling tape 2. The surface of the antifouling layer was observed with a digital microscope, and it was found that the riblet structure having a riblet height h of 16 µm, a pitch S (µm) of the groove structure of 50 µm, and S/h of 3.1 was provided.

The antifouling tape 1 produced in Example 20 and the antifouling tape 2 produced in Example 21 each were adhered from the surface on the side of the pressure-sensitive adhesive layer to a test plate formed of polyvinyl chloride, and the test plate thus prepared was subjected to the same test as in the evaluation of the elution rate described above. The test plate was mounted in such a manner that the longitudinal direction of the riblet grooves of the antifouling coating film was horizontal with respect to the rotation direction of the rotor, i.e., the water flow. As a result, the disappearance depth of the copper pyrithione from the antifouling coating film of the antifouling tape 1 was 35 µm, which was the same result as in Example 3, and the disappearance depth of the copper pyrithione from the antifouling coating film of the antifouling tape 2 was 37 µm, which was the same result as in Example 4, from which it was found that the elution of the organism repellent (B) under a dynamic water flow was suppressed to enable the formation of an antifouling tape having an antifouling layer excellent in sustained release property.

Reference Example: Measurement of Water Flow Frictional Resistance

[Production of Test Plate]

An epoxy resin corrosion coating composition (manufactured by Chugoku Marine Paints, Ltd.) and a silicone resin tie-coating ("CMP Bioclean Tie-coat", manufactured by Chugoku Marine Paints, Ltd.) were coated in this order on a test plate (length: 700 mm, width: 100 mm, thickness: 5.5 mm, formed of stainless steel (SUS 316L)) with an interval between the coating operations of 6 hours to an average thickness after drying (curing) of 50 µm each. The coating composition of Production Example 5 was coated thereon by air spraying to an average thickness after drying (curing) of 200 µm, followed by drying (curing) for 10 minutes, and then a surface having a groove structure of a PMMA panel having a V-shaped groove surface structure having an apex angle of 90° and a pitch of 0.05 mm (4 sheets of "LPV90-0.05", manufactured by Nihon Tokushu Kogaku Jushi Co., Ltd., were adjoined to make the edges thereof contacting each other) as a mold was placed on the coating film in such a manner that the longitudinal direction of the groove structure agreed with the longitudinal direction of the test plate. After curing at ordinary temperature for 24 hours, the mold was removed to provide a test piece with antifouling coating film.

[Measurement of Friction Coefficient to Water Flow]

A circulating water tank was used that was equipped with a water storage tank, a water flow pump, a water flow meter, a water temperature meter, a straightener, a contractor, and a test part having a wall surface having the test plate disposed on a part thereof and a measuring device for the differential pressure before and after the test plate, and was constituted by a water conduit, in which water flowed in the aforementioned order and returned to the water storage tank. The test plate was mounted on the test part in such a manner that the longitudinal direction of the groove structure on the surface of the test plate was horizontal with respect to the water flow, and the differential pressure, the water flow amount, and the water temperature were obtained when the water flow pump was driven to make a water flow rate condition of 1 m/s, 3 m/s, and 5 m/s, so as to measure the friction coefficient (water flow frictional resistance) of the surface of the test plate.

The values of the friction coefficient of the test plate produced above and a noncoated test plate (comparative plate) and the friction coefficient reduction rates (%) based on the comparative plate are shown in Table 5. As clear from these results, it is found that the antifouling coating film of the present invention provides the effect of decreasing the water flow frictional resistance.

TABLE 5

| | Friction coefficient | | |
|---|---|---|---|
| Flow rate | Test plate | Comparative plate | Reduction rate |
| 1 m/s | 0.0229 | 0.0245 | −7.0% |
| 3 m/s | 0.0188 | 0.0198 | −5.3% |
| 5 m/s | 0.0171 | 0.0176 | −3.3% |

The invention claimed is:

1. An antifouling coating film comprising a binder (A) and an organism repellent (B), having a riblet structure on a surface thereof,
   the organism repellent (B) comprising at least one selected from the group consisting of copper pyrithione, zinc pyrithione, 4-bromo-2-(4-chlorophenyl)-5-(trifluoromethyl)-1H-pyrrole-3-carbonitrile, and 4,5-dichloro-2-n-octyl-4-isothiazolin-3-one,
   wherein the binder (A) comprises an antifouling coating composition comprising a binder forming component (a),
   wherein the binder forming component (a) comprises a curable organopolysiloxane.

2. The antifouling coating film of claim 1, wherein the antifouling coating composition further comprises a slip agent (C).

3. The antifouling coating film according to claim 2, wherein the slip agent (C) comprises at least one selected from the group consisting of a silicone oil (C1) and a polymer (C2) comprising a constituent unit derived from a hydrophilic group-containing unsaturated monomer.

4. The antifouling coating film of claim 1, wherein the riblet structure includes a groove structure.

5. The antifouling coating film of claim 1, wherein the riblet structure has a riblet height of 1 to 100 µm.

6. The antifouling coating film of claim 1, wherein the antifouling coating composition further comprises an inorganic filler (D).

7. The antifouling coating film according to claim 6, wherein the inorganic filler (D) comprises silica, and the silica is mixed in the antifouling coating composition in the form of a kneaded product with the curable organopolysiloxane.

8. The antifouling coating film of claim 1, wherein the organism repellent (B) comprises at least one selected from the group consisting of copper pyrithione and zinc pyrithione.

9. The antifouling coating film of claim 1, wherein the antifouling coating film further comprises a slip agent (C).

10. The antifouling coating film according to claim 9, wherein the slip agent (C) comprises at least one selected from the group consisting of a silicone oil (C1) and a polymer (C2) comprising a constituent unit derived from a hydrophilic group-containing unsaturated monomer.

11. The antifouling coating film of claim 1, wherein the antifouling coating film further comprises an inorganic filler (D).

12. The antifouling coating film according to claim 11, wherein the inorganic filler (D) comprises silica, and the silica is mixed in the antifouling coating composition in the form of a kneaded product with the curable organopolysiloxane.

13. A method of manufacturing the antifouling coating film of claim 1, the method of manufacturing the antifouling coating film, comprising transferring a surface shape of a mold having the riblet structure to the surface of the antifouling coating film, or forming the antifouling coating film on a substrate or a coating film having the riblet structure, so as to form the riblet structure on a surface of the antifouling coating film.

14. A water-contacting structure with an antifouling coating film comprising a water-contacting structure having on at least a part of a surface thereof the antifouling coating film of claim 1.

15. An antifouling tape comprising an antifouling layer comprising the antifouling coating film of claim 1 and a pressure-sensitive adhesive layer, the antifouling layer and the pressure-sensitive adhesive layer being laminated directly or via an optional intermediate layer, the antifouling layer having the riblet structure at least on a surface opposite to the pressure-sensitive adhesive layer.

16. A method of manufacturing the antifouling tape according to claim 15, the method of manufacturing the antifouling tape, comprising transferring a surface shape of a mold having a negative structure of the riblet structure to a surface of the antifouling layer, or forming a substrate layer having the riblet structure and forming the antifouling layer on the substrate layer, so as to form the riblet structure on a surface of the antifouling layer opposite to the substrate layer.

* * * * *